US011734825B2

United States Patent
Nishimura et al.

(10) Patent No.: US 11,734,825 B2
(45) Date of Patent: Aug. 22, 2023

(54) SEGMENTATION DEVICE AND METHOD OF GENERATING LEARNING MODEL

(71) Applicant: J. MORITA MFG. CORP., Kyoto (JP)

(72) Inventors: Yuu Nishimura, Kyoto (JP); Hideki Yoshikawa, Kyoto (JP); Tomoyuki Sadakane, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 212 days.

(21) Appl. No.: 17/063,726

(22) Filed: Oct. 6, 2020

(65) Prior Publication Data

US 2021/0104048 A1 Apr. 8, 2021

(30) Foreign Application Priority Data

Oct. 7, 2019 (JP) ................. 2019-184672

(51) Int. Cl.
*G06T 7/11* (2017.01)
*G06T 7/00* (2017.01)

(52) U.S. Cl.
CPC .............. *G06T 7/11* (2017.01); *G06T 7/0012* (2013.01); *G06T 2207/10081* (2013.01); *G06T 2207/10088* (2013.01); *G06T 2207/20081* (2013.01); *G06T 2207/30036* (2013.01)

(58) Field of Classification Search
None
See application file for complete search history.

(56) References Cited

U.S. PATENT DOCUMENTS

| 2019/0026599 | A1* | 1/2019  | Salah         | G06F 18/22 |
| 2019/0180443 | A1* | 6/2019  | Xue           | G06V 10/44 |
| 2020/0167994 | A1* | 5/2020  | Jesenko       | G06T 17/00 |
| 2020/0175678 | A1* | 6/2020  | Abraham       | G16H 30/40 |
| 2020/0175681 | A1* | 6/2020  | Ezhov         | G06T 7/10  |
| 2020/0320685 | A1* | 10/2020 | Anssari Moin  | G06V 10/454 |
| 2020/0349698 | A1* | 11/2020 | Minchenkov    | G06N 3/045 |
| 2021/0090272 | A1* | 3/2021  | Meyer         | G06N 20/00 |
| 2021/0104039 | A1* | 4/2021  | Arai          | G06N 3/08  |
| 2021/0104048 | A1* | 4/2021  | Nishimura     | G06T 7/0012 |
| 2021/0150702 | A1* | 5/2021  | Claessen      | G06T 7/0012 |

FOREIGN PATENT DOCUMENTS

| CN | 108470375 A   | 8/2018  |
| CN | 109766877 A   | 5/2019  |
| JP | H8-215192 A   | 8/1996  |
| JP | 2013-233168 A | 11/2013 |
| JP | 2019-072531 A | 5/2019  |

(Continued)

OTHER PUBLICATIONS

"U-net based metal segmentation on projection domain for metal artifact reduction in dental CT, Biomedical Engineering Letters", Aug. 1, 2019, vol. 9, p. 375-385-p.

(Continued)

*Primary Examiner* — Gandhi Thirugnanam
(74) *Attorney, Agent, or Firm* — Shinjyu Global IP

(57) ABSTRACT

A learning model provided in a segmentation device is a learning model which is generated using training data such that segmentation data of a feature region is output when at least one of projection data and reconfiguration data acquired by an imaging device or data derived from the at least one of projection data and reconfiguration data is input.

14 Claims, 24 Drawing Sheets

(56) References Cited

FOREIGN PATENT DOCUMENTS

| JP | 2019-115545 A | 7/2019 | |
|---|---|---|---|
| WO | 2015/076406 A1 | 5/2015 | |
| WO | WO-2015076406 A1 * | 5/2015 | ........... A61B 5/0088 |
| WO | 2019/002631 A1 | 1/2019 | |
| WO | WO-2019002631 A1 * | 1/2019 | ......... G06K 9/00201 |

OTHER PUBLICATIONS

Search Report from the corresponding European Patent Application No. 20200322.4 dated Jul. 2, 2021.
Jader Gil et al, "Deep Instance Segmentation of Teeth in Panoramic X-Ray Images", 2018 31st Sibgrapi Conference On Graphics, Patterns and Images (Sibgrapi), IEEE, Oct. 29, 2018, p. 400-p. 407, XP033502173.

\* cited by examiner

SEGMENTATION DEVICE AND METHOD OF GENERATING LEARNING MODEL

CROSS-REFERENCE TO RELATED APPLICATIONS

This application claims priority to Japanese Patent Application No. 2019-184672, filed on Oct. 7, 2019. The contents of that application are incorporated by reference herein in their entirety.

TECHNICAL FIELD

The present disclosure relates to a segmentation device and a method of generating a learning model.

BACKGROUND ART

Technology of performing segmentation on an image or the like obtained by an X-ray CT scan (for example, see Japanese Unexamined Patent Publication No. H8-215192) is known.

BRIEF SUMMARY

In the related art, segmentation of a biological tissue in a medical image has been mathematically performed on the basis of CT values, concentration values, or the like. In this case, there is a problem in that it is difficult to segment tissues with close CT values, concentration values, or the like. A person's intervention (determination) is required for segmentation in consideration of an influence of conditions at the time of imaging or variables such as individual differences. Accordingly, there is demand for improvement in segmentation accuracy without requiring a person's intervention.

An objective of the present disclosure is to provide a segmentation device and a method of generating a learning model that can improve segmentation accuracy.

According to an aspect of the present disclosure, there is provided a segmentation device including: an input unit configured to receive an input of data of a constituent maxillofacial region which is at least a part of a maxillofacial region; an execution unit configured to perform segmentation of a feature region which is at least one of a biological feature region and an artificial feature region included in the constituent maxillofacial region using the data of the constituent maxillofacial region input to the input unit and a previously generated learning model; and an output unit configured to output a result of execution from the execution unit, wherein the learning model is a model which is generated using training data such that segmentation data of the feature region is output when at least one of projection data and reconfiguration data acquired by an X-ray CT scan or an MRI scan, or data derived from the at least one of projection data and reconfiguration data is input.

With this segmentation device, segmentation of a feature region is performed using a constituent maxillofacial region and a previously generated learning model. The learning model is a learning model which is generated using training data such that segmentation data of the feature region is output when at least one of projection data and reconfiguration data acquired by an X-ray CT scan or an MRI scan, or data derived from the at least one of projection data and reconfiguration data is input. Accordingly, it is possible to segment a feature region using projection data and reconfiguration data acquired by an X-ray CT scan or an MRI scan or the like. By performing segmentation using the learning model in this way, a likelihood of improvement in segmentation accuracy increases, for example, in comparison with a case in which segmentation is mathematically performed on the basis of a CT value, a concentration value, or the like. This configuration is particularly useful for segmentation of tissues which are close to each other in position and CT value. With improvement in accuracy, a likelihood of a person's intervention not being required also increases.

The data of the constituent maxillofacial region input to the input unit may be data of a tooth region or data of a region including the tooth region and a surrounding region thereof. Accordingly, it is possible to segment the tooth region or the region including the tooth region and the surrounding region thereof from the constituent maxillofacial region.

The segmentation data output from the learning model may be segmentation data of at least one of teeth, enamel, dentine, dental pulp, dental pulp cavities, cementum, cortical bone, cancellous bone, neural tubes, blood vessels, a jawbone, and a highly X-ray absorbent material. Accordingly, it is possible to segment tissues (compositions) such as teeth, enamel, dentine, dental pulp, dental pulp cavities, cementum, cortical bone, cancellous bone, neural tubes, blood vessels, and a jawbone and a highly X-ray absorbent material. For example, this configuration is useful for segmentation of tissues such as cortical bone, dentine, and cancellous bone which are close to (overlap) each other in CT value.

The training data may include training data in which the data of the constituent maxillofacial region and the segmentation data of the highly X-ray absorbent material are associated with each other. In this case, the learning model can segment a highly X-ray absorbent material from the constituent maxillofacial region.

The training data may include training data in which the data of the constituent maxillofacial region and the segmentation data of the tooth region are associated with each other. In this case, the learning model can segment the tooth region from the constituent maxillofacial region.

The training data may include training data in which data of a region including at least the tooth region in the constituent maxillofacial region and the segmentation data of each of a plurality of biological feature regions in the tooth region are associated with each other. In this case, the learning model can segment each region of a plurality of biological feature regions in the tooth region from the region including at least the tooth region in the constituent maxillofacial region.

The training data may include training data in which the data of the region including at least the tooth region and segmentation data of regions of enamel, dentine, and dental pulp in the tooth region are associated with each other. In this case, the learning model can segment the regions of enamel, dentine, and dental pulp in the tooth region from the region including at least the tooth region.

The training data may include training data in which the data of the constituent maxillofacial region and the segmentation data of the cortical bone and the alveolar bone are associated with each other. In this case, the learning model can segment the cortical bone and the alveolar bone from the constituent maxillofacial region. When the cortical bone and the alveolar bone close to each other in CT value are segmented, segmentation of other tissues becomes easy.

The learning model may be a model which is generated using the training data such that the segmentation data of the highly X-ray absorbent material is output when the data of the constituent maxillofacial region is input. Accordingly, it is possible to segment the highly X-ray absorbent material from the constituent maxillofacial region.

The learning model may be a model which is generated using the training data such that the segmentation data of the tooth region in the constituent maxillofacial region is output when the data of the constituent maxillofacial region is input. Accordingly, it is possible to segment the tooth region in the constituent maxillofacial region from the constituent maxillofacial region.

The learning model may be a model which is generated using the training data such that the segmentation data of each of the plurality of biological feature regions in the tooth region is output when the data of the region including at least the tooth region in the constituent maxillofacial region is input. Accordingly, it is possible to segment each of the plurality of biological feature regions in the tooth region from the region including at least the tooth region in the constituent maxillofacial region.

The learning model may be a model which is generated using the training data such that the segmentation data of the cortical bone and the alveolar bone is output when the data of the constituent maxillofacial region is input. Accordingly, it is possible to segment the cortical bone and the alveolar bone from the constituent maxillofacial region.

The training data may include at least one of first training data in which the data of the constituent maxillofacial region and segmentation data of a highly X-ray absorbent material are associated with each other, second training data in which the data of the constituent maxillofacial region and segmentation data of a tooth region are associated with each other, third training data in which data of a region including at least a tooth region in the constituent maxillofacial region and segmentation data of each of a plurality of biological feature regions in the tooth region are associated with each other, and fourth training data in which the data of the constituent maxillofacial region and segmentation data of cortical bone and alveolar bone are associated with each other. When the training data includes the first training data, the learning model can segment the highly X-ray absorbent material from the constituent maxillofacial region. When the training data includes the second training data, the learning model can segment the tooth region from the constituent maxillofacial region. When the training data includes the third training data, the learning model can segment each of the plurality of biological feature regions in the tooth region from the region including at least the tooth region in the constituent maxillofacial region. When the training data includes the fourth training data, the learning model can segment the cortical bone and the alveolar bone from the constituent maxillofacial region.

The learning model may include at least one of a first learning model which is generated using the first training data such that the segmentation data of the highly X-ray absorbent material is output when the data of the constituent maxillofacial region is input, a second learning model which is generated using the second training data such that the segmentation data of the tooth region is output when the data of the constituent maxillofacial region is input, a third learning model which is generated using the third training data such that the segmentation data of each of the plurality of biological feature regions in the tooth region is output when the data of the region including at least the tooth region in the constituent maxillofacial region is input, and a fourth learning model which is generated using the fourth training data such that the segmentation data of the cortical bone and the alveolar bone is output when the data of the constituent maxillofacial region is input. When the learning model includes the first learning model, the learning model can segment the highly X-ray absorbent material from the constituent maxillofacial region. When the learning model includes the second learning model, the learning model can segment the tooth region from the constituent maxillofacial region. When the learning model includes the third learning model, the learning model can segment each of the plurality of biological feature regions in the tooth region from the region including at least the tooth region in the constituent maxillofacial region. When the learning model includes the fourth learning model, the learning model can segment the cortical bone and the alveolar bone from the constituent maxillofacial region.

The learning model may include the first learning model and the second learning model, and the execution unit may be configured to acquire the segmentation data of the highly X-ray absorbent material by inputting the data of the constituent maxillofacial region to the first learning model, to generate artifact reduction data in which artifacts due to the highly X-ray absorbent material have been removed or reduced using the acquired segmentation data, and to perform segmentation of the tooth region by inputting the generated artifact reduction data to the second learning model. By using the first learning model and the second learning model in combination in this order, the likelihood of improvement in segmentation accuracy further increases in comparison with a case in which the learning models are independently used. Particularly, since an influence of artifacts is curbed, it is possible to improve segmentation accuracy.

The learning model may include the second learning model and the third learning model, and the execution unit may be configured to acquire the segmentation data of the tooth region by inputting the data of the constituent maxillofacial region to the second learning model, to generate data of the tooth region using the acquired segmentation data, and to acquire segmentation data of enamel, dentine, and dental pulp and to perform segmentation of the feature region by inputting the generated data of the tooth region to the third learning model. By using the second learning model and the third learning model in combination in this order, the likelihood of improvement in segmentation accuracy further increases in comparison with a case in which the learning models are independently used. Particularly, since segmentation is performed with a focus on the tooth region, it is possible to further improve segmentation accuracy in comparison with a case in which segmentation is performed along with another region (for example, cortical bone and alveolar bone).

The learning model may include the second learning model and the fourth learning model, and the execution unit may be configured to acquire the segmentation data of the tooth region by inputting the data of the constituent maxillofacial region to the second learning model, to perform a division process of dividing the tooth region and a region other than the tooth region in the constituent maxillofacial region using the acquired segmentation data, and to acquire segmentation data of the cortical bone and the alveolar bone in the region other than the tooth region and to perform segmentation of the feature region by inputting the data of the constituent maxillofacial region having been subjected to the division process to the fourth learning model. By using the second learning model and the fourth learning model in combination in this order, the likelihood of improvement in segmentation accuracy further increases in comparison with a case in which the learning models are independently used.

Particularly, since segmentation is performed with a focus on a region other than the tooth region, it is possible to further improve segmentation accuracy in comparison with a case in which segmentation is performed along with the tooth region.

According to another aspect of the present disclosure, there is provided a method of generating a learning model of the segmentation device, including at least one of: generating the learning model using the first training data when the training data includes the first training data; generating the learning model using the second training data when the training data includes the second training data; generating the learning model using the third training data when the training data includes the third training data; and generating the learning model using the fourth training data when the training data includes the fourth training data.

With this method of generating a learning model, it is possible to obtain a learning model which is generated using at least one of the first training data, the second training data, the third training data, and the fourth training data.

A method of generating a learning model may include: when the training data includes the second training data, the third training data, and the fourth training data, a step of preparing the second training data using segmentation data which is acquired by inputting the data of the constituent maxillofacial region to the learning model; a step of training the learning model using the prepared second training data; and a step of acquiring the segmentation data of the tooth region by inputting the data of the constituent maxillofacial region to the trained learning model, and the method may further include one of steps (a), (b), and (c):

(a) a step of preparing the third training data using the segmentation data of the tooth region and a step of training the learning model using the prepared third training data;

(b) a step of preparing the fourth training data using the segmentation data of the tooth region and a step of training the learning model using the prepared fourth training data; and (c) a step of preparing the third training data using the segmentation data of the tooth region, a step of training the learning model using the prepared third training data, a step of preparing the fourth training data using the segmentation data which is acquired by inputting the data of the constituent maxillofacial region to the trained learning model, and a step of training the learning model using the prepared fourth training data.

In this way, by performing learning using the second training data, learning using the third training data, and learning using the fourth training data in various combinations, the likelihood of improvement in segmentation accuracy further increases in comparison with a case in which the learning is independently performed.

A method of generating a learning model may include: a step of preparing the first training data before a step of preparing the second training data; and a step of training the learning model using the prepared first training data before the step of preparing the second training data, and the step of preparing the second training data, a step of preparing the third training data, and a step of preparing the fourth training data may include preparing training data in which artifacts due to a highly X-ray absorbent material have been removed or reduced using segmentation data which is acquired by inputting data of the region including at least a tooth region to the learning model. In this case, the learning model can segment a feature region from data in which artifacts have been removed or reduced. By using such learning models for the data in which artifacts have been removed or reduced, since an influence of artifacts is curbed, it is possible to further increase the likelihood of improvement in segmentation accuracy.

A method of generating a learning model may include: a step of preparing the first training data, the second training data, the third training data, and the fourth training data; and a step of training the learning model by weighting and using the prepared first training data, the prepared second training data, the prepared third training data, and the prepared fourth training data. Accordingly, it is possible to further increase the likelihood of improvement in segmentation accuracy.

In the segmentation device, the execution unit may be configured to acquire segmentation data of enamel, cementum, dentine, and alveolar bone using the data of the constituent maxillofacial region input to the input unit and the learning model, and to calculate an absorbance of the alveolar bone on the basis of the acquired segmentation data. Accordingly, it is possible to measure the absorbance of the alveolar bone.

The execution unit may be configured to calculate the absorbance of the alveolar bone on the basis of a ratio of a second distance from a boundary between enamel and dentine in the acquired segmentation data of enamel, cementum, dentine, and the alveolar bone to an alveolar crest to a first distance from the boundary to a root apex of the alveolar bone. Accordingly, it is possible to calculate the absorbance of the alveolar bone.

According to the present disclosure, it is possible to provide a segmentation device and a method of generating a learning model that can improve segmentation accuracy.

DETAILED DESCRIPTION

Figure 1:
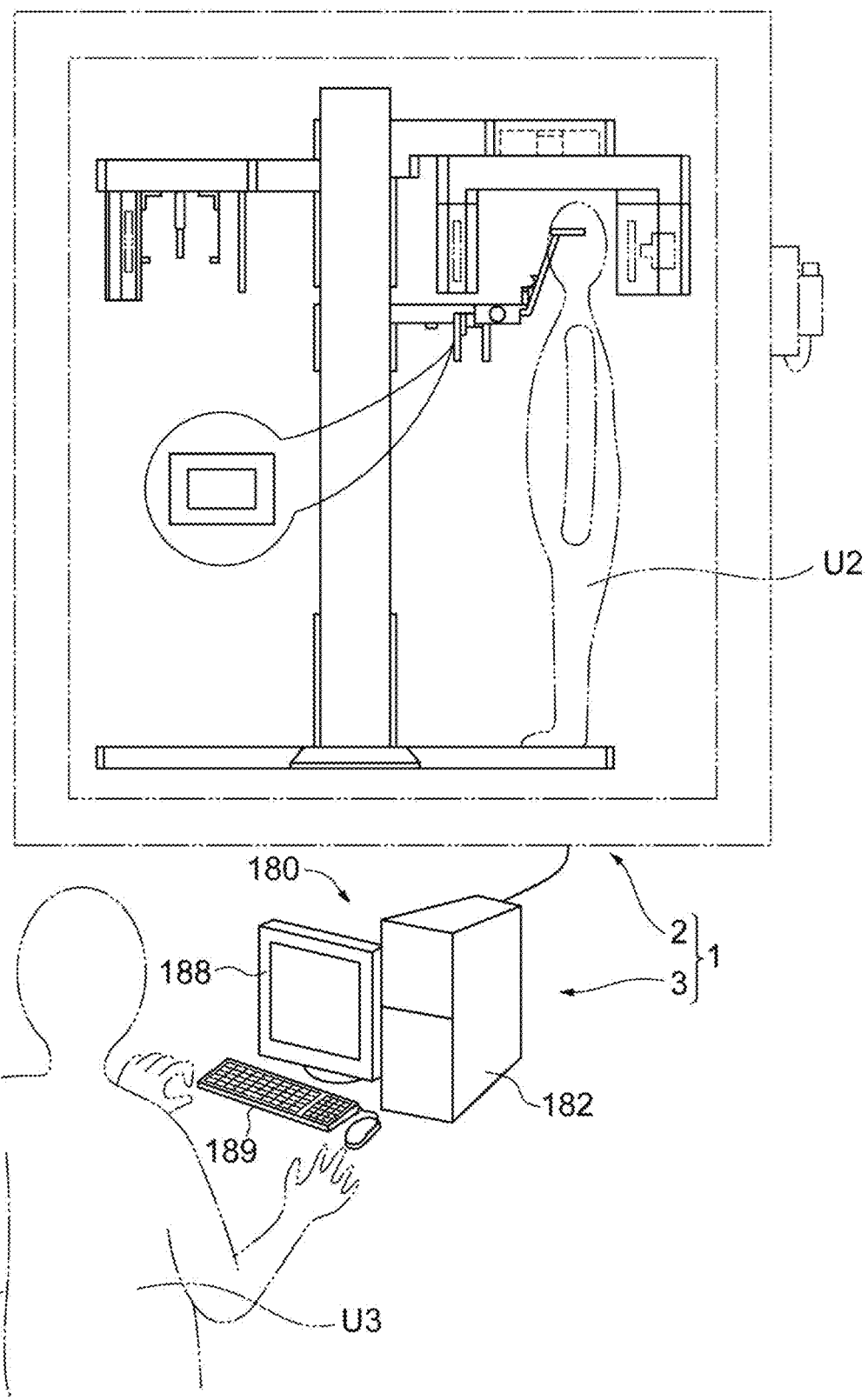
FIG. 1 is a diagram schematically illustrating a segmentation device.

Hereinafter, embodiments of the present disclosure will be described with reference to the accompanying drawings. In the drawings, the same elements will be referred to by the same reference signs and description thereof will not be repeated.

FIG. 1 is a diagram schematically illustrating a segmentation device according to an embodiment. In this example, the segmentation device is a constituent element of a segmentation system. The segmentation system 1 includes an imaging device 2 and the segmentation device 3. A user of the imaging device 2 is referred to and illustrated as a user U2. A user of the segmentation device 3 is referred to and illustrated as a user U3. The imaging device 2 and the segmentation device 3 are configured such that data acquired by the imaging device 2 is used by the segmentation device 3. Use of such data may be realized through unidirectional communication from the imaging device 2 to the segmentation device 3, bidirectional communication between the imaging device 2 and the segmentation device 3, or the like.

Examples of the imaging device 2 include an X-ray CT scanner and an MRI scanner. When the imaging device 2 is an X-ray CT scanner, the imaging device 2 performs an X-ray CT scan on the user U2. When the imaging device 2 is an MRI scanner, the imaging device 2 performs an MRI scan on the user U2. An imaging object is a constituent maxillofacial region of the user U2. The constituent maxillofacial region is the maxillofacial region or a partial region of a maxillofacial part. The maxillofacial region is the jaw region including the upper and lower tooth regions and the mouth. A partial region of the maxillofacial part is a partial region of the maxillofacial region. Examples of the partial region of the maxillofacial part include the upper and lower tooth regions and the jaw region serving to support the teeth. The imaging device 2 acquires data of the constituent maxillofacial region through imaging. The data acquired by the imaging device 2 is sent (input) to the segmentation device 3.

The data which is acquired by the imaging device 2 and input to the segmentation device 3 may be projection data. Reconfiguration (Reconstruction) data, slice image data, volume-rendered image data, or the like may be input to the segmentation device 3. The reconfiguration data, the slice image data, and the volume-rendered image data may be obtained by processing projection data. Such data is data (image data) which is acquired through an X-ray CT scan or an MRI scan. In this embodiment, image data which is acquired through an X-ray CT scan or an MRI scan may be referred to as captured image data.

In this embodiment, primary image data which is acquired through an X-ray CT scan or an MRI scan by the imaging device 2 or the like is referred to as captured raw image data. Data which is acquired by processing captured raw image data is referred to as captured processed image data. For example, when the captured raw image data is projection data, three-dimensional image data, reconfiguration data, slice image data, volume-rendered image data and the like which is acquired by processing the projection data is an example of captured processed image data. Projection data may be preprocessed and the preprocessed image data may be additionally processed into three-dimensional image data, reconfiguration data, slice image data, volume-rendered image data, or the like. The preprocessed image data in this case is an example of captured processed image data. The captured image data includes the captured raw image data and the captured processed image data.

Captured image data may not be data which is imaged by the imaging device 2. The captured image data has only to be data which can be processed by the segmentation device 3 and may be data which is imaged by another imaging device. That is, data which is imaged by another imaging device and stored in a recording medium may be input to the segmentation device 3 as captured image data.

The captured image data may be captured raw image data or image data derived from the captured raw image data. The captured image data may be captured processed image data or image data derived from the captured processed image data.

Some or all processing of the captured raw image data may be performed by the imaging device 2 or may be performed by the segmentation device 3. Some or all processing of the captured raw image data may be shared by the imaging device 2 and the segmentation device 3.

Some or all additional processing of the captured processed image data may be performed by the imaging device 2 or may be performed by the segmentation device 3. Some or all additional processing of the captured processed image data may be shared by the imaging device 2 and the segmentation device 3.

The reconfiguration data includes data for reproducing a current state of an imaging region of a subject by processing projection data. This data may be two-dimensional image data or may be three-dimensional image data. An example of two-dimensional image data is slice image data. An example of three-dimensional image data is volume data or volume-rendered image data. The reconfiguration data represents, for example, a measured value for each voxel. An example of the measured value is a CT value. The slice image data may be a plurality of slice images (a slice image group). The reconfiguration data is formed using projection data, for example, on the basis of a known method. An example of a data format which is input to the segmentation device 3 is digital imaging and communications in medicine (DICOM). An arbitrary combination of projection data, reconfiguration data, a slice image, and the like may be input to the segmentation device 3.

The segmentation device 3 performs segmentation on data of the constituent maxillofacial region acquired by the imaging device 2. Segmentation includes distinguishment, identification, and the like of a feature region which is included in the constituent maxillofacial region. Segmentation is also referred to as "clustering," "labeling," or the like. For example, by segmentation of reconfiguration data, the tissue in the constituent maxillofacial region that each voxel corresponds to is identified. A result of segmentation in this case may be data in which each voxel (a voxel number, XYZ coordinate values, or the like) and information for identifying a tissue (for example, enamel, dentine, or dental pulp)

are associated with each other. The result of segmentation is presented to the user U3, for example, in the form of an image. An example of the result of segmentation which is presented to the user U3 will be described below with reference to FIGS. 2A to 5B.

Figure 2A:
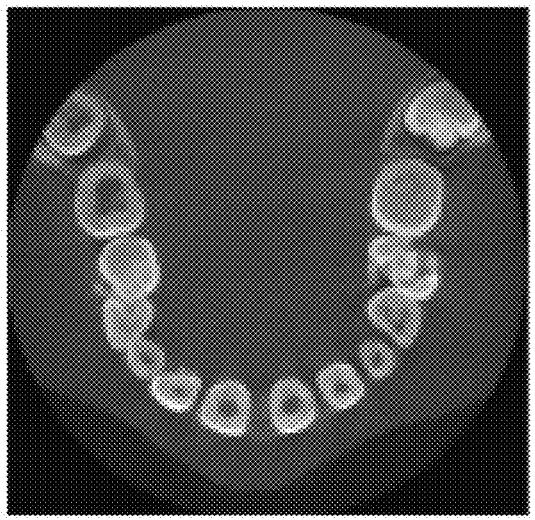
FIGS. 2A and 2B are diagrams illustrating an example of segmentation.
Figure 2B:
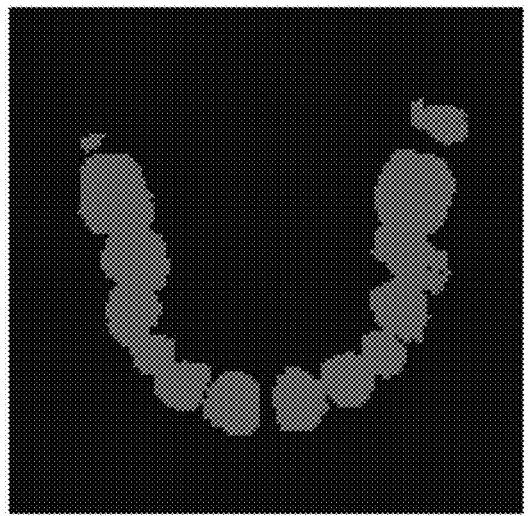

The segmentation device 3 may present images illustrated in FIGS. 2A and 2B. FIG. 2A illustrates an image including a tooth region of the user U2 and a surrounding region thereof when seen from a substantially vertical direction. FIG. 2B illustrates a result of segmentation on the image illustrated in FIG. 2A. In this example, the result of segmentation is an image in which the tooth region in the image illustrated in FIG. 2A is masked. An image other than the masked part is removed. In this example, the removed part is expressed by data corresponding to black (a predetermined CT value or the like).

Display of a masked image as a result of segmentation is effective for visual and intuitive ascertainment of a region. In display of the result of segmentation, the corresponding region may be divisionally displayed by any one of a boundary line and a color. Divisional display in color includes divisional display in monochromatic brightness, a process of translating a region in an original image to a color region, and superposition or synthesis with a transparent color.

Figure 3A:
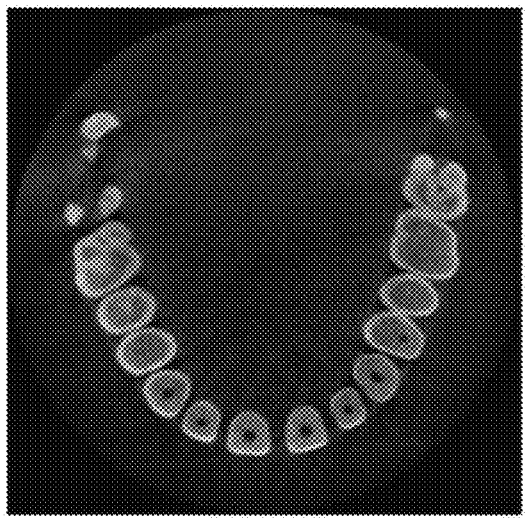
FIGS. 3A and 3B are diagrams illustrating an example of segmentation.
Figure 3B:
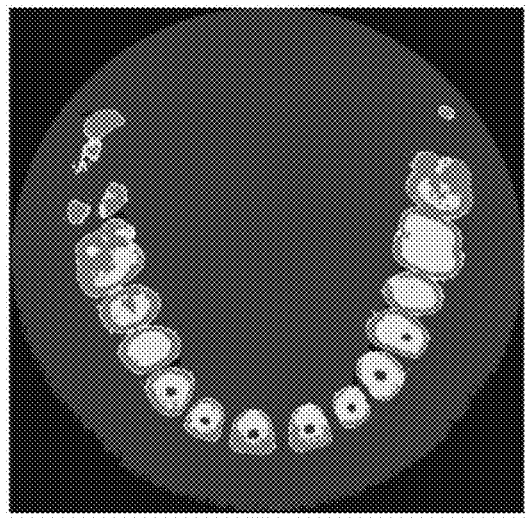

The segmentation device 3 may present images illustrated in FIGS. 3A and 3B. FIG. 3A illustrates an image including a tooth region of the user U2 and a surrounding region thereof when seen from a substantially vertical direction. FIG. 3B illustrates a result of segmentation on the image illustrated in FIG. 3A. In this example, the result of segmentation is an image in which regions of enamel, dentine, and dental pulp in the tooth region in the image illustrated in FIG. 3A are masked. The regions of enamel, dentine, and dental pulp are masked in different colors.

Figure 4A:
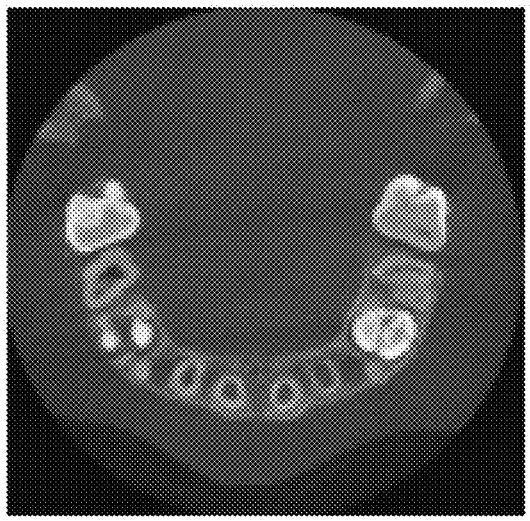
FIGS. 4A and 4B are diagrams illustrating an example of segmentation.
Figure 4B:
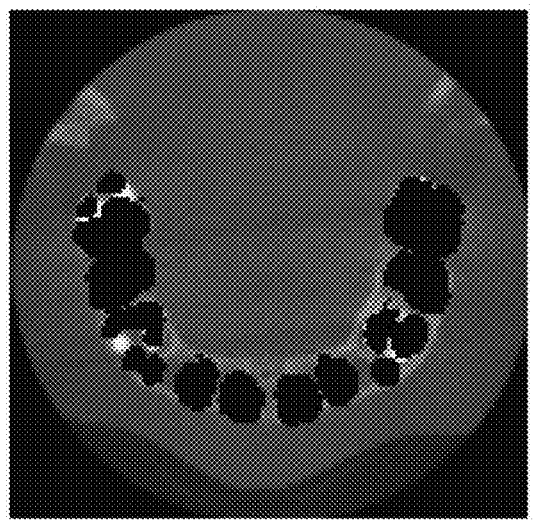

The segmentation device 3 may present images illustrated in FIGS. 4A and 4B. FIG. 4A illustrates an image including a tooth region of the user U2 and a surrounding region thereof when seen from a substantially vertical direction. FIG. 4B illustrates a result of segmentation on the image illustrated in FIG. 4A. In this example, the result of segmentation is an image in which the tooth region in the image illustrated in FIG. 4A is masked. In the result of segmentation, a region other than the tooth region (particularly alveolar bone and cortical bone) becomes more conspicuous.

Figure 5A:
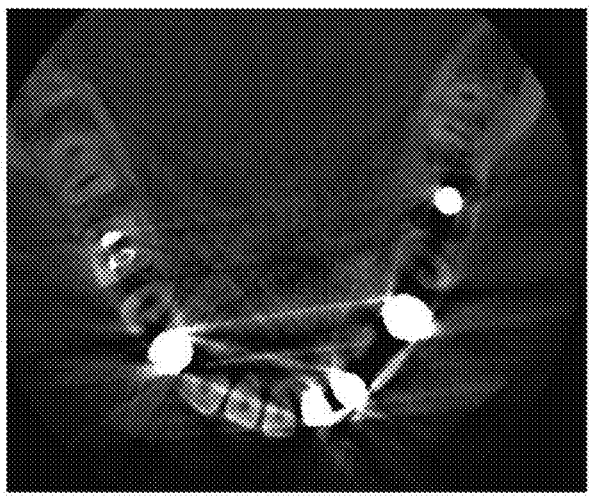
FIGS. 5A and 5B are diagrams illustrating an example of segmentation.
Figure 5B:
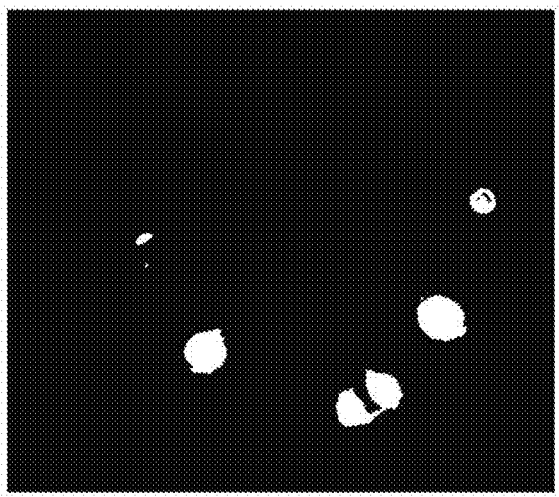

The segmentation device 3 may present images illustrated in FIGS. 5A and 5B. FIG. 5A illustrates an image including a tooth region of the user U2 and a surrounding region thereof when seen from a substantially vertical direction. FIG. 5B illustrates a result of segmentation on the image illustrated in FIG. 5A. In this example, the result of segmentation is an image in which only a highly X-ray absorbent material in the image illustrated in FIG. 4A is left.

FIGS. 2A to 5B described above illustrate an example in which a segmentation object is an image of a tooth region and a surrounding region thereof when seen from a substantially vertical direction. Here, the segmentation object is not limited to this example. For example, the segmentation object may be an image when seen from a direction other than the substantially vertical direction or an image of only a tooth region. The segmentation object may be a moving image. For example, the result of segmentation can support the user U3 such as a doctor or observer, also can support the user U3 for diagnosis. Even only displaying the result of segmentation of a tooth or teeth can help the user U3 to understand the construction of the tooth or teeth, or placement of a tissue or tissues and so on. The segmentation object may be, for example, projection data which is acquired while performing a CT scan. Details thereof will be described later with reference to FIGS. 8A to 8E.

Referring back to FIG. 1, the segmentation device 3 may be a computer device including a processor (such as a CPU) and a memory (such as a ROM and a RAM). The computer device may include an input interface that directly or indirectly receives data from the imaging device 2 and receives an operation of the user U3 and an output interface that presents information such as a result of segmentation to the user U3. In the example illustrated in FIG. 1, a main body 182 of a computer device 180 constituting the segmentation device 3 includes a processor and a memory. A keyboard 189 of the computer device 180 or a connection portion of the main body 182 to a communication cable from the imaging device 2 corresponds to the input interface. A display 188 of the computer device 180 corresponds to the output interface.

Figure 6:
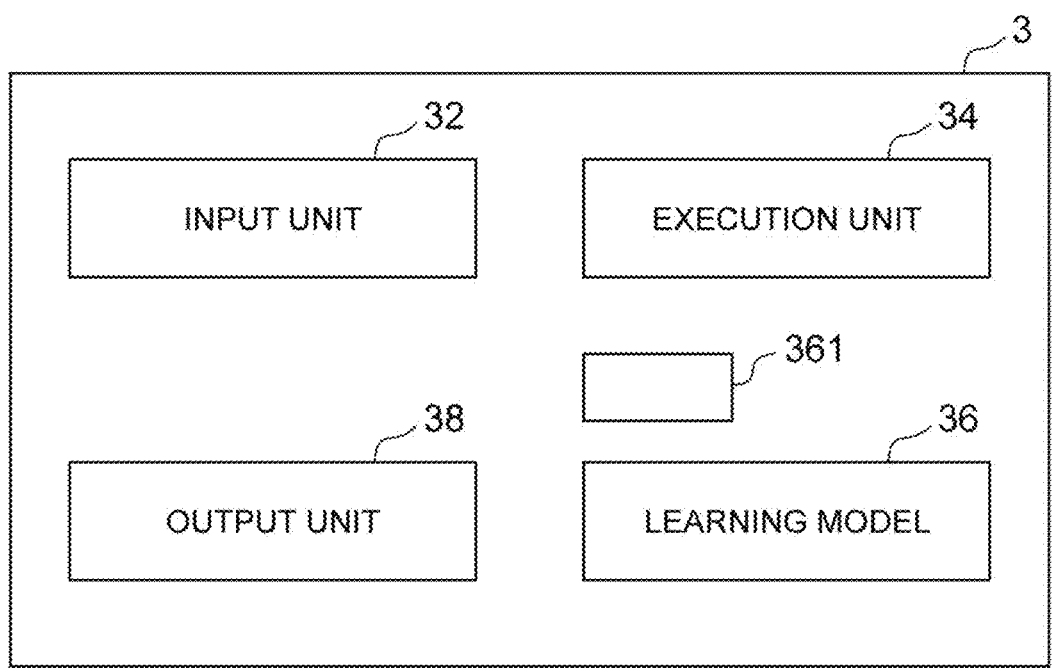
FIG. 6 is a diagram illustrating an example of functional blocks of the segmentation device.

FIG. 6 is a diagram illustrating an example of functional blocks of the segmentation device. The segmentation device 3 includes an input unit 32, an execution unit 34, a learning model 36, and an output unit 38.

The input unit 32 is a unit (input means) that receives an input of data of the constituent maxillofacial region. The input unit 32 may be configured, for example, to have a function of the input interface. The input interface which receives the physical operation of the user such as keyboard or mouse and so on can be called as "physical interface".

The execution unit 34 is a unit (execution means) that performs segmentation of a feature region using data input to the input unit 32 and the learning model 36. A feature region is at least one of a biological feature region and an artificial feature region which are included in the constituent maxillofacial region. Examples of the biological feature region include regions of tissues such as teeth, enamel, dentine, dental pulp, dental pulp cavities, cementum, cortical bone, cancellous bone, neural tubes, blood vessels, and the jawbone. An example of the artificial feature region is a region of a highly X-ray absorbent material. An example of the highly X-ray absorbent material is a metallic prosthesis.

The execution unit 34 inputs data to the learning model 36. Data which is input to the learning model 36 may be data of a constituent maxillofacial region which is input to the input unit 32 or may be data derived from the data of the constituent maxillofacial region input to the input unit 32. The data derived therefrom may be preprocessed data. Examples of preprocessing include convolution, pooling, and trimming The data derived therefrom may be data which is once or more input to the learning model 36 and output from the learning model 36.

A learning model input unit 361 that receives an input of captured image data of a constituent maxillofacial region and sends the captured image data of the constituent maxillofacial region to the learning model 36 may be provided in the segmentation device 3. The learning model 36 may be connected to the learning model input unit 361. The input unit 32 may also serve as the learning model input unit 361. Alternatively, the learning model input unit 361 and the input unit 32 may be separately provided. When the learning model input unit 361 and the input unit 32 are separately provided, for example, data input to the input unit 32 may not be processed and automatically input to the learning model input unit 361. Alternatively, the execution unit 34 may process the captured image data input to the input unit 32 and automatically input the processed captured image data to the learning model input unit 361.

For example, projection data which is acquired by the imaging device 2 may be input to the input unit 32 of the segmentation device 3. Then, the execution unit 34 may generate processed image data such as reconfiguration data, slice image data, and volume-rendered image data by processing the projection data. The processed image data may be automatically input to the learning model 36 via the learning model input unit 361. The captured image data which is input to the input unit 32 may be captured raw image data or captured processed image data. The captured image data which is input to the learning model input unit 361 may be captured raw image data or captured processed image data.

Data which is input to the input unit 32 or the learning model input unit 361 may include, for example, accessory information data of captured image data such as a tube current or a tube voltage at the time of capturing the image.

The learning model 36 is a learning model which was generated in advance. The learning model 36 which has been updated after the segmentation device 3 was manufactured is also an example of a learning model which was generated in advance. The learning model 36 is generated (trained) using training data such that segmentation data of the feature region is output when at least one of projection data acquired through an X-ray CT scan or an MRI scan in the imaging device 2 and reconfiguration data or data derived from the data is input.

Training of the learning model 36 may be machine learning (training) using training data. Machine learning includes various techniques such as an SVM, a neural network, and deep learning. When the learning model 36 includes a neural network, the learning model 36 may be a trained model including parameters of an intermediate layer of the neural network which has been tuned using training data. In this way, when the learning model 36 includes a neural network, the neural network may be configured as a multilayer perceptron including an input layer, a hidden layer, and an output layer.

The training data may include first training data. The first training data is training data in which data of a constituent maxillofacial region and segmentation data of a highly X-ray absorbent material are associated with each other. By training the learning model 36 using the first training data, the learning model 36 is configured to output segmentation data of a highly X-ray absorbent material when the data of the constituent maxillofacial region is input.

The training data may include second training data. The second training data is training data in which data of a constituent maxillofacial region and segmentation data of a tooth region are associated with each other. By training the learning model 36 using the second training data, the learning model 36 is configured to output segmentation data of the tooth region when at least the data of the constituent maxillofacial region is input.

The data of the constituent maxillofacial region in the second training data may be data of the whole constituent maxillofacial region or may be data of a partial region of the constituent maxillofacial region. A local X-ray CT scan of locally imaging only a partial region of the constituent maxillofacial region, particularly, only a region of some teeth in a dental arch and a surrounding region thereof may be performed. In this case, data of the partial region of the constituent maxillofacial region and segmentation data of the tooth region are associated with each other. In an actual local X-ray CT scan, since positioning of a subject is successful in most cases, the data of the constituent maxillofacial region may be limited to a region including at least the tooth region included in the constituent maxillofacial region. Here, there is a likelihood that positioning will fail and a tooth region will not be included in data of a partial region of the constituent maxillofacial region. Accordingly, in consideration of this case, a result of segmentation indicating "no tooth region" may be output when a tooth region is not included.

Data of the whole constituent maxillofacial region and segmentation data of a tooth region in the whole tooth region (the whole dental arch) may be associated with each other.

When segmentation is performed on the inside of a local region in training the learning model 36 using the second training data, the learning model 36 may be trained in advance to know which region in a maxillofacial region a target local region is and may be eventually configured to correctly recognize the local region even if there is no information of the position of the local region.

The training data may include third training data. The third training data may be training data in which data of a region including at least a tooth region in the constituent maxillofacial region and segmentation data of each of a plurality of biological feature regions in the tooth region are associated with each other. By training the learning model 36 using the third training data, the learning model 36 is configured to output segmentation data of each of the plurality of biological feature regions in the tooth region when at least data of the region including at least the tooth region in the constituent maxillofacial region is input.

More specifically, the third training data may be training data in which data of a region including at least the tooth region and segmentation data of regions of enamel, dentine, and dental pulp in the tooth region are associated with each other. In this case, by training the learning model 36 using the third training data, the learning model 36 is configured to output the segmentation data of the regions of enamel, dentine, and dental pulp in the tooth region when at least data of a region including at least the tooth region is input. Segmentation of a plurality of biological feature regions in the tooth region may include segmentation of a region of cementum in addition to segmentation of the regions of enamel, dentine, and dental pulp.

The "region including at least the tooth region" constituting the third training data may be, for example, a constituent maxillofacial region additionally including a region other than the tooth region. A configuration in which data of only a tooth region is given and the inside thereof is divided into biological feature regions has an advantage in a small burden, but data of only the tooth region does not have to be generated and a configuration in which the biological feature regions in the tooth region of the constituent maxillofacial region are extracted may be employed.

The total segmentation data of the regions of enamel, dentine, and dental pulp which is collected as the result of segmentation of enamel, dentine, and dental pulp in the constituent maxillofacial region may be used as the segmentation data of the tooth region. In this case, the third training data also serves as the second training data. The target region may include cementum in addition to enamel, dentine, and dental pulp.

The training data may include fourth training data. Basically, a jawbone supporting dental roots can be said to be a biological region supporting teeth with a periodontal membrane interposed therebetween. The biological region supporting teeth includes a biological feature region supporting teeth such as cortical bone and alveolar bone. The fourth training data may be training data in which data of a constituent maxillofacial region and segmentation data of each of a plurality of biological feature regions in the biological region supporting teeth are associated with each other. By training the learning model 36 using the fourth training data, the learning model 36 is configured to output segmentation data of each of the plurality of biological feature regions supporting the teeth in the constituent maxillofacial region when at least data of the constituent maxillofacial region is input.

More specifically, the fourth training data may be training data in which data of the constituent maxillofacial region and segmentation data of the biological feature region supporting teeth in the constituent maxillofacial region are associated with each other. In this case, by training the learning model 36 using the fourth training data, the learning model 36 is configured to output the segmentation data of the biological feature region supporting teeth in the constituent maxillofacial region when at least the data of the constituent maxillofacial region is input. The biological feature region supporting teeth can be each region of the biological feature region supporting teeth. The fourth training data may be training data in which data of the constituent maxillofacial region and segmentation data of the regions of cortical bone and alveolar bone in the constituent maxillofacial region are associated with each other. In this case, by training the learning model 36 using the fourth training data, the learning model 36 is configured to output the segmentation data of the regions of cortical bone and alveolar bone in the constituent maxillofacial region when at least the data of the constituent maxillofacial region is input.

The fourth training data may be training data in which data of a biological region supporting teeth in the constituent maxillofacial region and segmentation data of the regions of cortical bone and alveolar bone included in the biological region supporting the teeth in the constituent maxillofacial region are associated with each other. In this case, by training the learning model 36 using the fourth training data, the learning model 36 is configured to output the segmentation data of the regions of cortical bone and alveolar bone included in the biological region supporting the teeth when at least the data of the biological region supporting the teeth in the constituent maxillofacial region is input.

When training of the learning model 36 is performed using a plurality of pieces of training data, only one learning model may be prepared and training of the same learning model using a plurality of different pieces of training data may be performed. Alternatively, a plurality of learning models corresponding to the respective pieces of training data may be prepared and training using training data corresponding to the learning models may be performed. The latter will be described below with reference to FIGS. 7A and 7B.

Figure 7A:
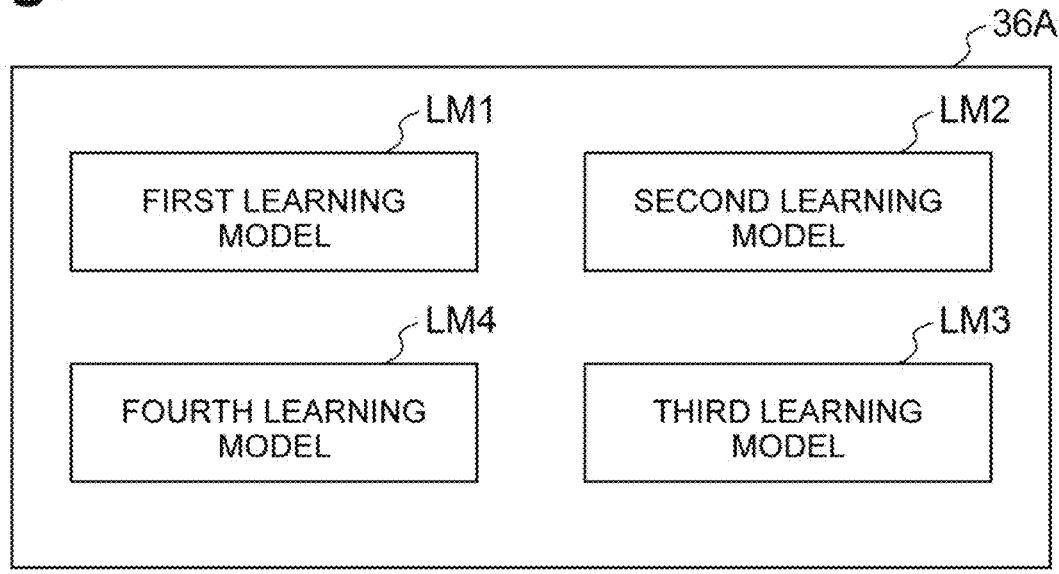
FIGS. 7A and 7B are diagrams illustrating an example of functional blocks of the segmentation device.

A learning model 36A illustrated in FIG. 7A includes a learning model LM1, a learning model LM2, a learning model LM3, and a learning model LM4.

The learning model LM1 is a first learning model which is generated using the first training data such that segmentation data of a highly X-ray absorbent material is output when data of a constituent maxillofacial region is input. The data of the constituent maxillofacial region may be input to the input unit 32 or the learning model input unit 361.

The learning model LM2 is a second learning model which is generated using the second training data such that segmentation data of a tooth region in a constituent maxillofacial region is output when data of the constituent maxillofacial region is input. The data of the constituent maxillofacial region may be input to the input unit 32 or the learning model input unit 361.

The learning model LM3 is a third learning model which is generated using the third training data such that segmentation data of each of a plurality of biological feature regions in a tooth region is output when data of a region including at least the tooth region in a constituent maxillofacial region is input. The learning model LM3 may be generated using the third training data such that segmentation data of regions of enamel, dentine, and dental pulp in the tooth region is output when the data of the region including at least the tooth region is input. The segmentation data which is output from the learning model LM3 may also include segmentation data of a region of cementum.

The learning model LM4 is a fourth learning model which is generated using the fourth training data such that segmentation data of biological feature region supporting teeth in a constituent maxillofacial region is output when data of the constituent maxillofacial region is input. The data of the constituent maxillofacial region may be input to the input unit 32 or the learning model input unit 361. More specifically, the learning model LM4 may be generated using the fourth training data such that segmentation data of regions of cortical bone and alveolar bone in the constituent maxillofacial region is output when the data of the constituent maxillofacial region is input. The learning model LM4 may be generated using the fourth training data such that segmentation data of regions of cortical bone and alveolar bone included in a biological region supporting teeth in the constituent maxillofacial region is output when data of the biological region supporting teeth in the constituent maxillofacial region is input.

The learning model may include a learning model for processes other than segmentation in addition to the learning models for segmentation.

Figure 7B:
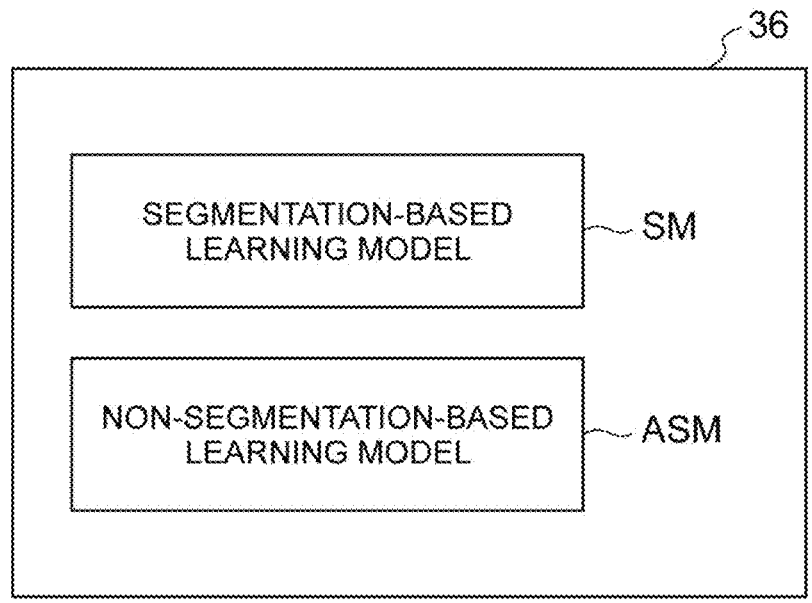

In the example illustrated in FIG. 7B, the learning model 36 may include a non-segmentation-based learning model ASM that mainly performs a process other than segmentation, that is, performs a non-segmentation-based process, in addition to a segmentation-based learning model SM that mainly performs segmentation, that is, performs a segmentation-based process.

The first to fourth learning models LM1 to LM4 are examples of the segmentation-based learning model SM. An example of the non-segmentation-based learning model ASM will be described later.

Examples of the first to fourth training data will be described below with reference to FIGS. 8A to 11C.

Figure 8A:
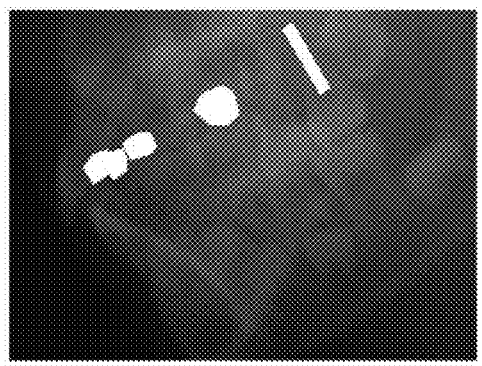
FIGS. 8A to 8E are diagrams illustrating an example of training data.
Figure 8B:
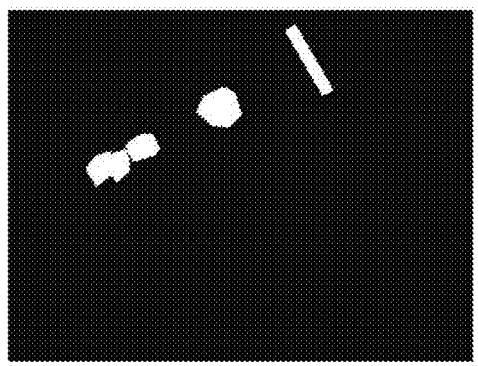
Figure 8C:
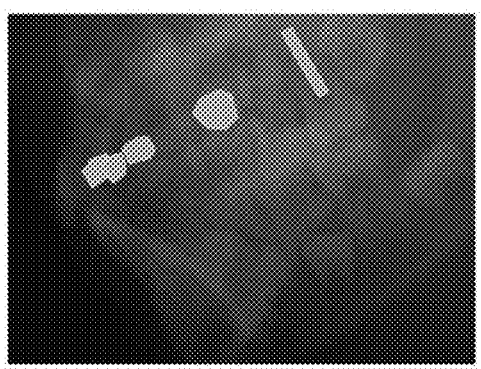

In the first training data illustrated in FIGS. 8A to 8E, images illustrated in FIGS. 8A and 8B are associated with each other. FIG. 8A illustrates a frame image, that is, projection data, when a subject is irradiated with X-rays from a certain direction at the time of an X-ray CT scan. The frame image illustrated in FIG. 8A is acquired at a time at which a maxillofacial region is irradiated with X-rays from one side. FIG. 8B illustrates an image in which only a highly X-ray absorbent material in the image illustrated in FIG. 8A is left. A highly X-ray absorbent material is, for example, metal which is used as a prosthesis or the like. Since a position thereof is identified by extraction of the highly X-ray absorbent material, an artifact reducing process can be performed. For example, as illustrated in FIG. 8C, the artifact reducing process includes a process of replacing a concentration of the highly X-ray absorbent material region in the projection data with an appropriate concentration at which artifacts are not generated (or artifacts can be reduced) with reference to regions other than the highly X-ray absorbent material region.

Figure 8D:
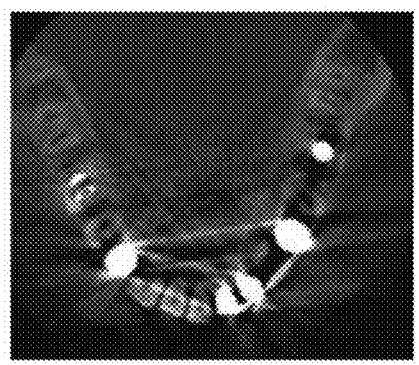
Figure 8E:
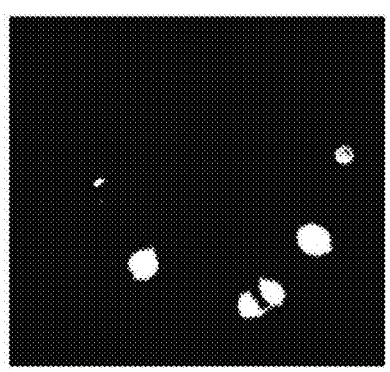

A reconfigured (reconstructed) image such as a CT image may be used to extract a highly X-ray absorbent material region. FIG. 8D is a CT image of a tooth region and a surrounding region thereof when seen from a substantially vertical direction. A CT image is temporarily reconfigured from projection data acquired through an X-ray CT scan and then the CT image illustrated in FIG. 8D is generated. An image illustrated in FIG. 8E is obtained by extracting only a highly X-ray absorbent material region in the image illustrated in FIG. 8D. Position information of the extracted highly X-ray absorbent material region can be used to identify a highly X-ray absorbent material region in FIG. 8A.

Figure 9A:
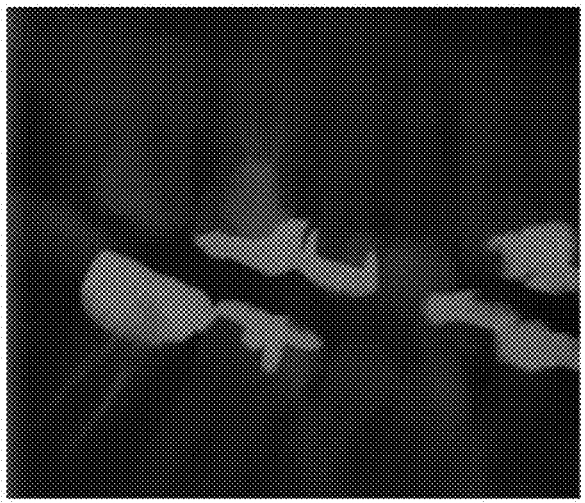
FIGS. 9A and 9B are diagrams illustrating an example of training data.
Figure 9B:
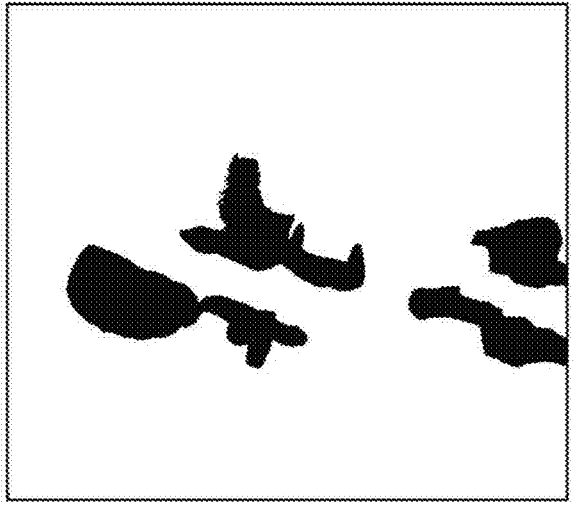

In the first training data illustrated in FIGS. 9A and 9B, images illustrated in FIGS. 9A and 9B are associated with each other. FIG. 9A illustrates an image of a tooth region and a surrounding region thereof when seen from a substantially horizontal direction. FIG. 9B illustrates an image in which only a metallic region in the image illustrated in FIG. 9A is masked and left (annotated). For example, metal is described as a representative example of a highly X-ray absorbent material herein, but the same is true of a highly X-ray absorbent material other than metal.

The first training data illustrated in FIGS. 8A to 8E and FIGS. 9A and 9B is prepared on the basis of measured data including a highly X-ray absorbent material. However, the first training data may be prepared on the basis of measured data not including a highly X-ray absorbent material. For example, the first training data may be prepared on the basis of simulation data which is obtained by adding data of a highly X-ray absorbent material to measured data.

Figure 10A:
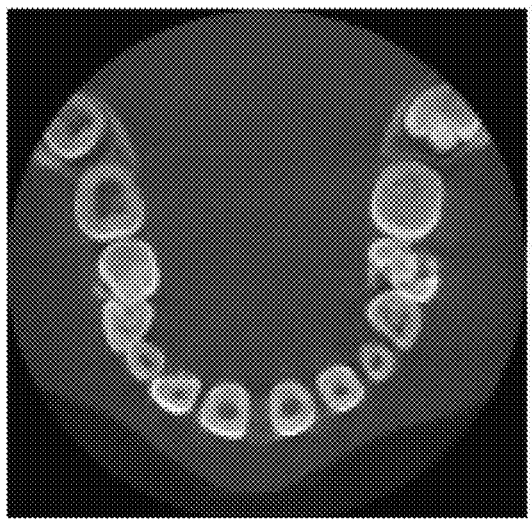
FIGS. 10A to 10C are diagrams illustrating an example of training data.
Figure 10B:
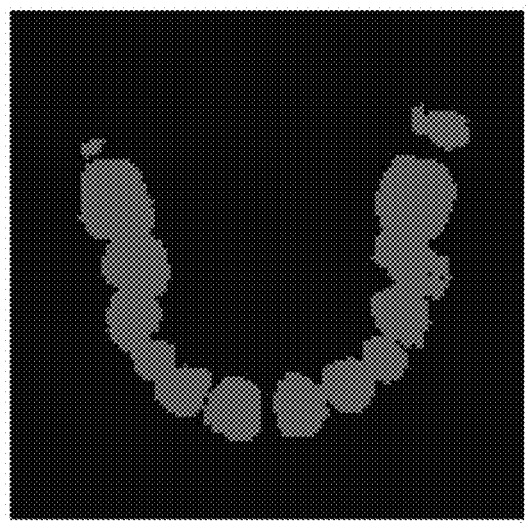
Figure 10C:

In the second training data illustrated in FIGS. 10A to 10C, images illustrated in FIGS. 10A and 10B are associated with each other. FIG. 10A illustrates an image of a tooth region and a surrounding region thereof when seen from a substantially vertical direction. FIG. 10A is an example of a CT image. FIG. 10B illustrates an image in which a tooth region (the entire teeth) in the image illustrated in FIG. 10A is masked. An image of a part other than the tooth region is removed. Instead of a process of removing an image of a part other than the tooth region as described above, a process of replacing the part other than the tooth region with a single color may be performed. The same is true of the following description. In the second training data, projection data illustrated in FIG. 10C may be additionally associated with the images illustrated in FIGS. 10A and 10B.

When the data of the constituent maxillofacial region is data of a reconfigured image, the data of a reconfigured image is three-dimensional data such as volume data of CT or MRI, and three-dimensional and a stereoscopic location of a tooth region in the three-dimensional data is recognized, coordinates of an occlusal surface in the volume data may be recognized and an image of a cross-section which is parallel to or substantially parallel to the occlusal surface may be generated. Alternatively, separation of maxillary teeth and mandibular teeth may be performed.

Regarding segmentation, segmentation in a slice image of a cross-section which is parallel to or substantially parallel to the occlusal surface may be performed, or cutting-out of a slice image may be performed after segmentation of a three-dimensional and stereoscopic tooth region has been performed.

Figure 11A:
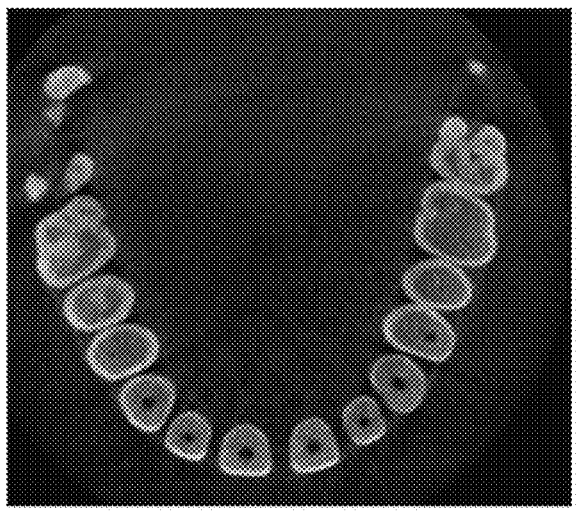
FIGS. 11A to 11C are diagrams illustrating an example of training data.
Figure 11B:
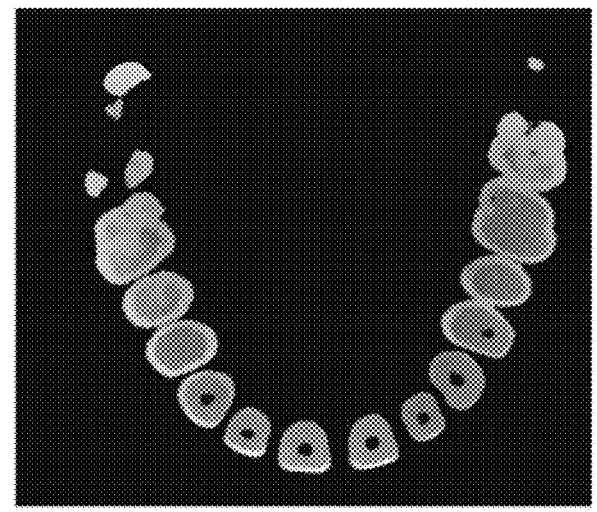
Figure 11C:
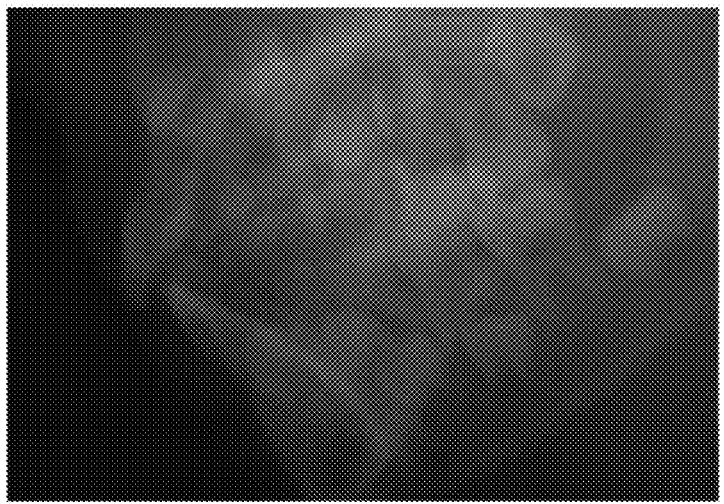

In the third training data illustrated in FIGS. 11A to 11C, images illustrated in FIGS. 11A and 11B are associated with each other. FIG. 11A illustrates an example of a CT image, FIG. 11A illustrates an image of a tooth region and a surrounding region thereof when seen from a substantially vertical direction. FIG. 11B illustrates an image in which enamel, dentine, and dental pulp in the image illustrated in FIG. 11A are masked with different colors. An image other than enamel, dentine, and dental pulp is removed. Enamel, dentine, dental pulp, and cementum in the image may be masked with different colors and an image other than enamel, dentine, dental pulp, and cementum may be removed. In the third training data, projection data illustrated in FIG. 11C may be additionally associated with the images illustrated in FIGS. 11A and 11B.

Figure 12A:
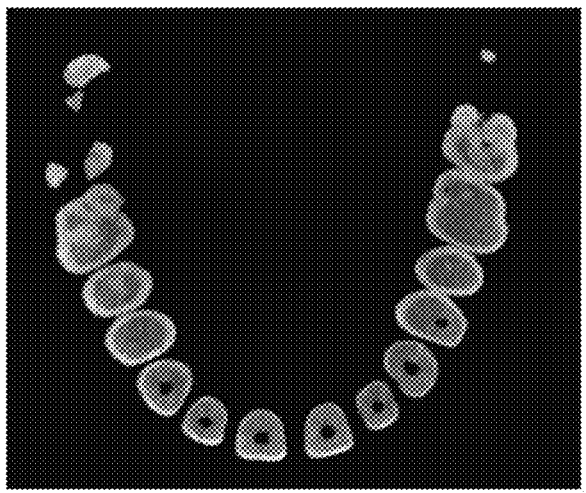
FIGS. 12A to 12C are diagrams illustrating an example of training data.
Figure 12B:
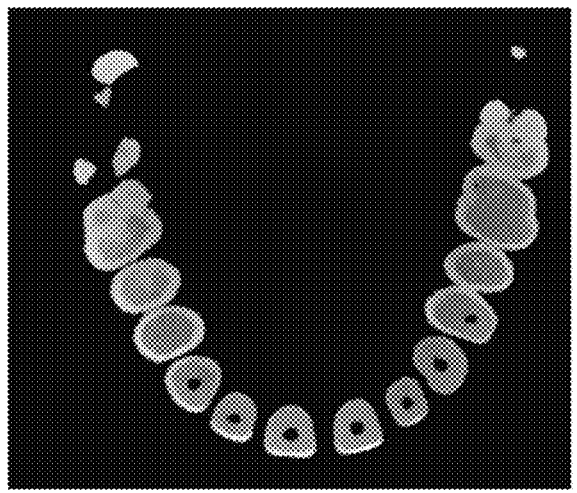
Figure 12C:
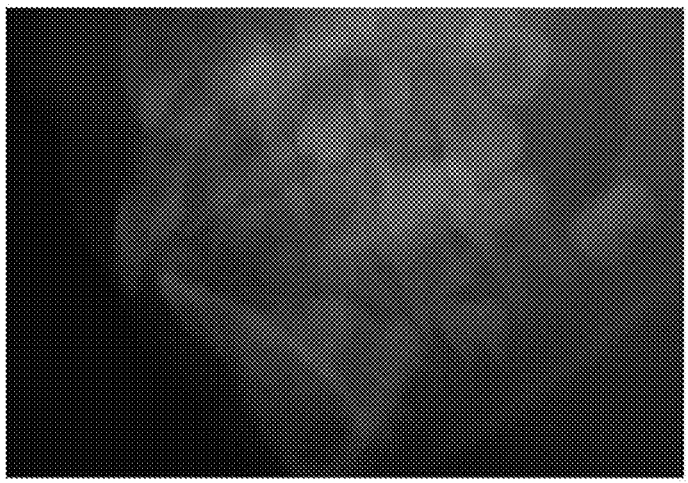

In the third training data illustrated in FIGS. 12A to 12C, images illustrated in FIGS. 12A and 12B are associated with each other. FIG. 12A illustrates an image of a tooth region when seen from a substantially vertical direction. This image is different from the image in FIG. 11A described above in that an image of a surrounding region of the tooth region is not included. That is, in the image illustrated in FIG. 12A, an image of the surrounding region of the tooth region is removed. FIG. 12B illustrates an image in which enamel, dentine, and dental pulp in the image illustrated in FIG. 12A are masked. In the third training data, projection data illustrated in FIG. 12C may be additionally associated with the images illustrated in FIGS. 12A and 12B.

In the step of generating segmentation data of a tooth region using the second learning model, data of an image of only the tooth region (data of an image of only teeth) may be extracted, the data of the image of only the tooth region may be segmented in the third learning model, and segmentation of the regions of enamel, dentine, and dental pulp or segmentation of the regions of enamel, dentine, dental pulp, and cementum may be performed. Position information of the data of the image of only the tooth region may be referred to.

Figure 13A:
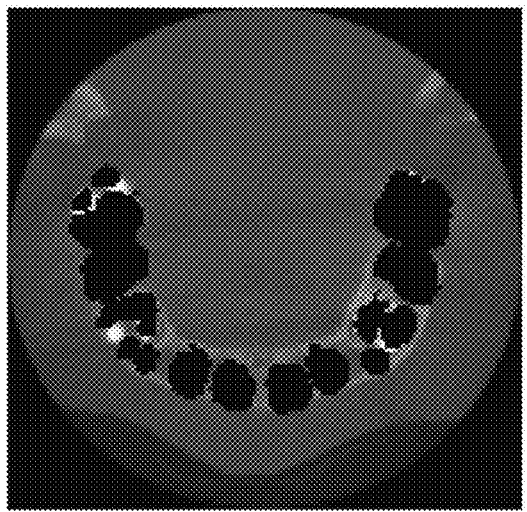
FIGS. 13A and 13B are diagrams illustrating an example of training data.
Figure 13B:
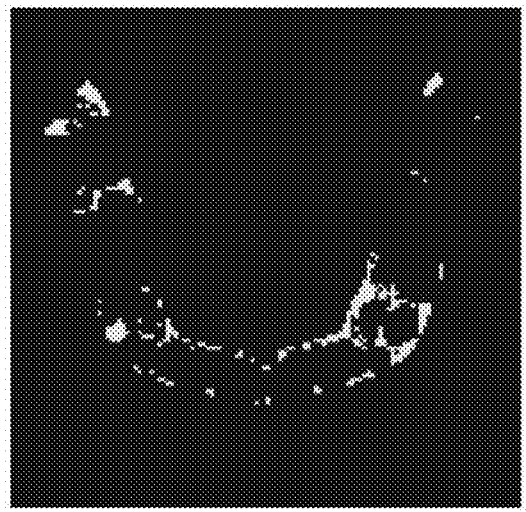

In the fourth training data illustrated in FIGS. 13A and 13B, images illustrated in FIGS. 13A and 13B are associated with each other. FIG. 13A illustrates an image of a tooth region and a surrounding region thereof when seen from a substantially vertical direction. In this image, an image of the tooth region is removed. The surrounding region of the tooth region is also a biological region supporting teeth in the constituent maxillofacial region. FIG. 13B illustrates an image in which cortical bone and alveolar bone in the image illustrated in FIG. 13A are segmented. An image other than the cortical bone and the alveolar bone is removed. When base data of the image illustrated in FIG. 10A and the image illustrated in FIG. 13B is common, the image illustrated in FIG. 10A and the image illustrated in FIG. 13B may be associated with each other.

In the step of generating segmentation data of a tooth region using the second learning model, data of an image of only the tooth region (data of an image of only teeth) may be extracted and position information of the data of the image of only the tooth region may be referred to in the fourth learning model.

Referring back to FIG. 6, the output unit 38 is a unit (execution means) that outputs a result of execution in the execution unit 34. The output unit 38 may be configured to have, for example, the function of the output interface. The output interface may include a display (for example, the display 188 in FIG. 1) that presents a segmentation result to the user U3 in the aspect described above with reference to FIGS. 2A to 5B.

Figure 14:
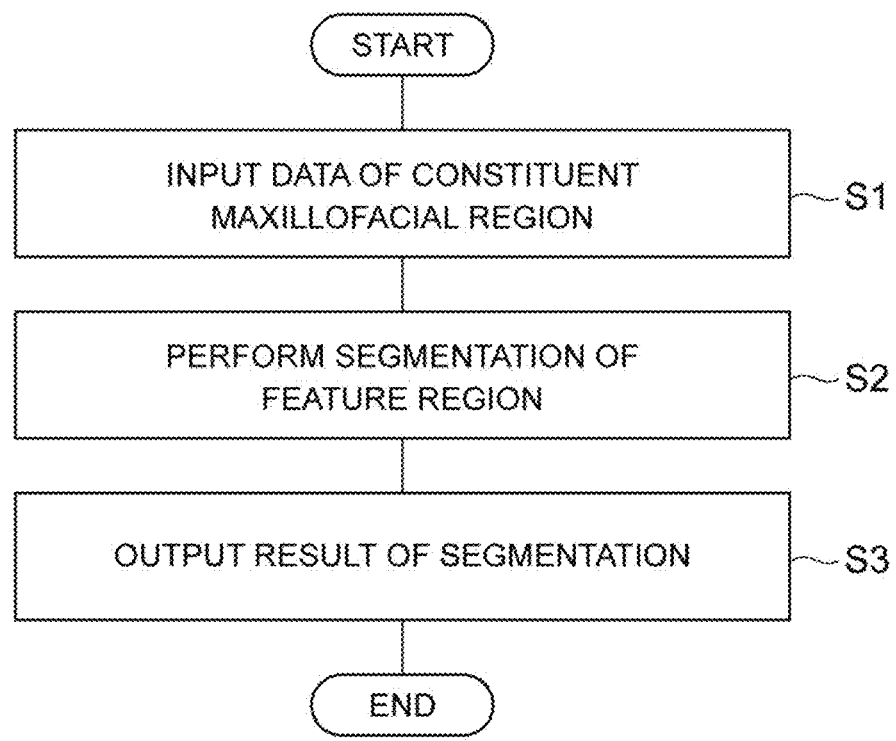
FIG. 14 is a flowchart illustrating an example of a process flow which is performed by the segmentation device.

FIG. 14 is a flowchart illustrating an example of a process flow which is performed by the segmentation device.

In Step S1, data of a constituent maxillofacial region acquired by the imaging device 2 is input to the input unit 32 of the segmentation device 3. For example, the images illustrated in FIGS. 2A, 3A, 4A, and 5A described above are input to the input unit 32.

In Step S2, the execution unit 34 performs segmentation of a feature region using the data of the constituent maxillofacial region input in Step S1 and the learning model 36 or the learning model 36A. Specifically, the execution unit 34 acquires segmentation data of the feature region by inputting the input data of the constituent maxillofacial region to the learning model 36 or the learning model 36A. Examples of the segmentation result include the images illustrated in FIGS. 2B, 3B, 4B, and 5B described above. The segmentation result may be an image in which the image illustrated in FIG. 2A, 3A, 4A, or 5A and corresponding image illustrated in FIG. 2B, 3B, 4B, or 5B are combined (for example, the images are arranged). Some specific examples when the learning model 36A is used will be described below with reference to FIGS. 15 to 18.

Figure 15:
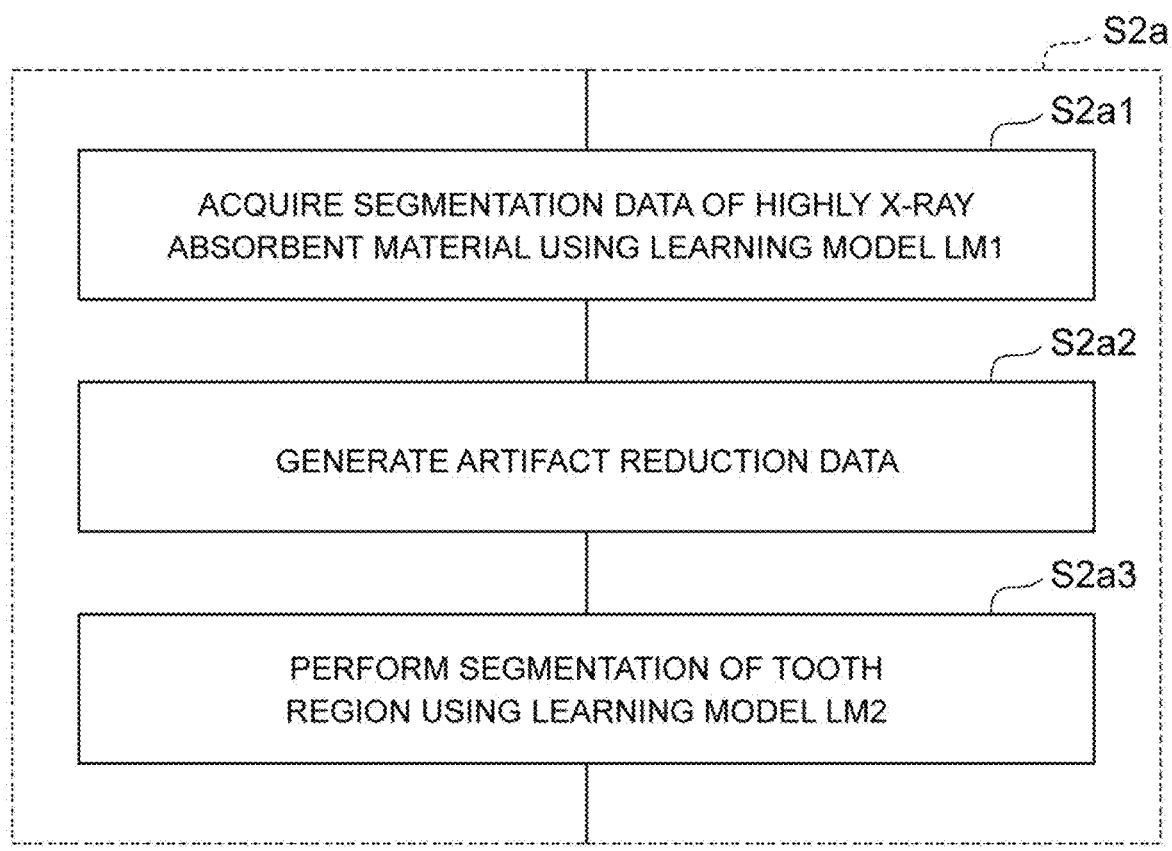
FIG. 15 is a flowchart illustrating an example of a process flow which is performed by the segmentation device.

Step S2a in FIG. 15 may be performed as Step S2 in FIG. 14 when the learning model 36A includes the learning model LM1 and the learning model LM2.

In Step S2a1, the execution unit 34 acquires segmentation data of a highly X-ray absorbent material by inputting the data of the constituent maxillofacial region input in Step S1 (see FIG. 14) to the learning model LM1.

In Step S2a2, the execution unit 34 generates artifact reduction data. The artifact reduction data is reconfiguration data in which artifacts have been removed or reduced. The artifact reduction data is acquired using the technique described above with reference to FIG. 8C or other known techniques on the basis of the segmentation data of the highly X-ray absorbent material acquired in Step S2a1. Artifacts are generated, for example, in case consistency in measured value (such as a CT value) between the highly X-ray absorbent material and the surroundings thereof due to presence of a highly X-ray absorbent material at the time of generating reconfiguration data from the projection data cannot be obtained. NMAR (Normalized Metal Artifact Reduction) process can be used for artifact removing/reducing process. The following examples can be used for artifact removing/reducing process. Namely, on the basis of the position information of the highly X-ray absorbent material extracted from the image as shown in FIG. 8E, the position of the highly X-ray absorbent material in the projection data acquired through the X-ray CT scan is specified. The value of the highly X-ray absorbent material region in the projection data is replaced by the value calculated from a value of the peripheral region of the highly X-ray absorbent material region. The projection data may be made into a sinogram, and the sine curve of the X-ray absorbent material region may be extracted, and the value of the sine curve may be replaced with an adjustment value calculated from the value of the non-highly X-ray absorbent material region. The artifact reduction data can be obtained by reconfiguring the projection data after the replacement. An artifact reduction CT image of the constituent maxillofacial region may be obtained by embedding the extracted image of the highly X-ray absorbent material region (for example, the image shown in FIG. 8E) in the artifact reduction data.

The artifact removing/reducing process may be learned by the learning model. The learning model of the artifact removing/reducing process is an example of the non-segmentation-based learning model ASM illustrated in FIG. 7B.

In Step S2a3, the execution unit 34 acquires segmentation data of a tooth region by inputting the artifact reduction data generated in Step S2a2 to the learning model LM2.

Figure 16:
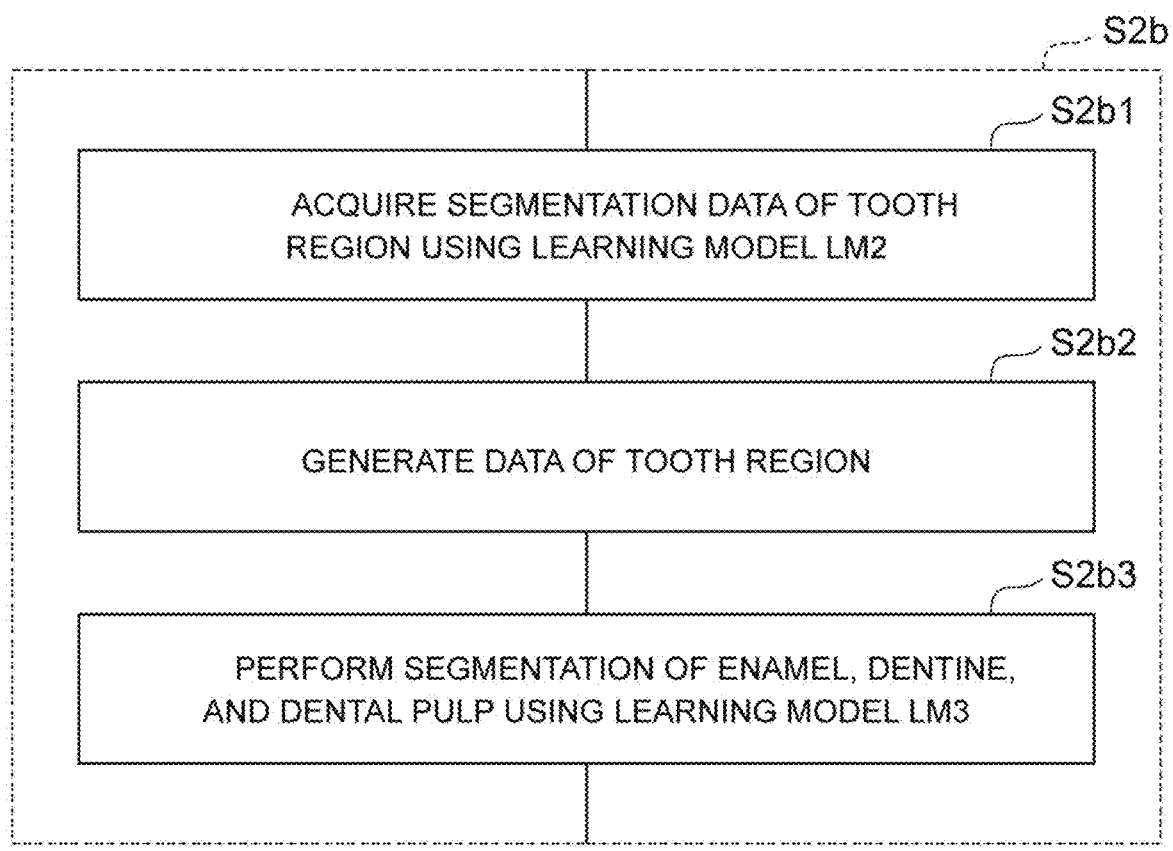
FIG. 16 is a flowchart illustrating an example of a process flow which is performed by the segmentation device.

Step S2b illustrated in FIG. 16 may be performed as Step S2 in FIG. 14 when the learning model 36A includes the learning model LM2 and the learning model LM3.

In Step S2b1, the execution unit 34 acquires segmentation data of the tooth region by inputting the data of the constituent maxillofacial region input in Step S1 (see FIG. 14) to the learning model LM2.

In Step S2b2, the execution unit 34 generates data of the tooth region. For example, the data of the tooth region is generated by extracting data of a part corresponding to the segmentation data of the tooth region acquired in Step S2b1 from the data of the constituent maxillofacial region input in Step S1.

The data of the tooth region may be extracted from information of the segmentation data illustrated in FIG. 10B. For example, by extracting a region corresponding to the masked region in FIG. 10B from the image in FIG. 10A, the data of the tooth region can be extracted. Generation of the image of only teeth may be learned by the learning model.

The learning model of the process of generating the image of only teeth is an example of the non-segmentation-based learning model ASM illustrated in FIG. 7B.

A part or total of a non-segmentation-based process may be shared by a segmentation-based learning model. For example, learning of the artifact removing/reducing process may be shared by at least one of the first learning model LM1, the second learning model LM2, and the third learning model LM3, and a reconfigured image with artifacts removed/reduced may be output. Generation of the image of only teeth may be shared by at least one of the second learning model LM2 and the third learning model LM3 and the image of only teeth may be output.

In Step S2b3, the execution unit 34 acquires segmentation data of enamel, dentine, and dental pulp or segmentation data of enamel, dentine, dental pulp, cementum by inputting the data of the tooth region generated in Step S2b2 to the learning model LM3.

By continuously performing from generation of the artifact reduction data in Step S2a2 to the process of Step S2b3, the segmentation data of enamel, dentine, and dental pulp or the segmentation data of enamel, dentine, dental pulp, and cementum in the artifact reduction data may be acquired.

Figure 17:
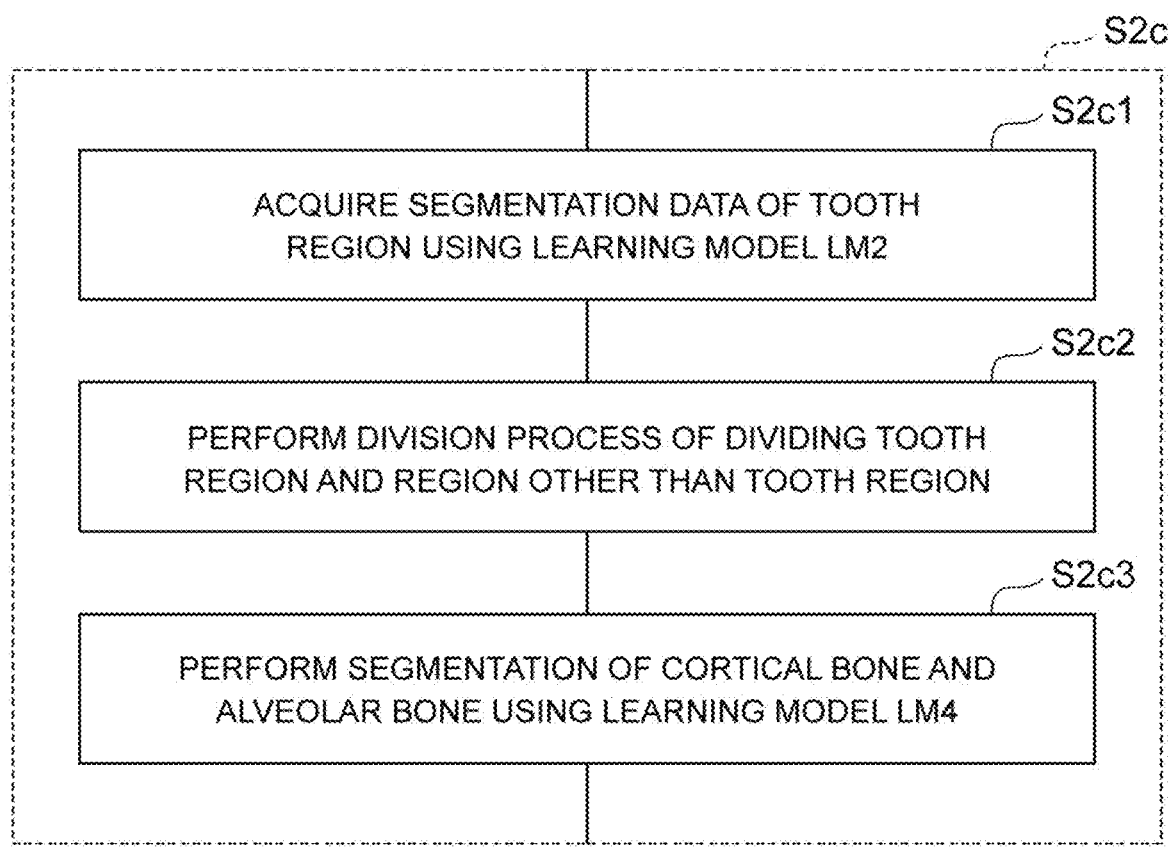
FIG. 17 is a flowchart illustrating an example of a process flow which is performed by the segmentation device.

Step S2c in FIG. 17 may be performed as Step S2 in FIG. 14 when the learning model 36A includes the learning model LM2 and the learning model LM4.

In Step S2c1, the execution unit 34 acquires segmentation data of the tooth region by inputting the data of the constituent maxillofacial region input in Step S1 to the learning model LM2.

In Step S2c2, the execution unit 34 performs a division process of dividing the tooth region and a region other than the tooth region. For example, by divisionally extracting a part corresponding to the segmentation data of the tooth region acquired in Step S2c1 and other part from the data of the constituent maxillofacial region input in Step S1, the tooth region and the region other than the tooth region are divided.

In Step S2c3, the execution unit 34 acquires segmentation data of cortical bone and alveolar bone by inputting the data of the region other than the tooth region, which has been divided in Step S2c2, to the learning model LM4.

By continuously performing from generation of the artifact reduction data in Step S2a2 to the process of Step S2c3, the segmentation data of cortical bone and alveolar bone in the artifact reduction data may be acquired.

Referring back to FIG. 14, in Step S3, the output unit 38 outputs the segmentation result. For example, the images illustrated in FIGS. 2B, 3B, 4B, and 5B are presented by the output unit 38.

The above-mentioned segmentation device 3 is specified, for example, as follows. That is, the segmentation device 3 includes an input unit 32, an execution unit 34, a learning model 36, and an output unit 38. Data of a constituent maxillofacial region which is a maxillofacial region of a partial region of the maxillofacial region is input to the input unit 32 (Step S1). The execution unit 34 performs segmentation of a feature region which is at least one of a biological feature region and an artificial feature region included in the constituent maxillofacial region using the data of the constituent maxillofacial region input to the input unit 32 and the learning model 36 or the learning model 36A which is generated in advance (Step S2). The output unit 38 outputs a result of execution from the execution unit 34 (Step S3). The learning model 36 or the learning model 36A is a learning model which is generated using training data such that segmentation data of the feature region is output when at least one of projection data acquired by the imaging device 2 and reconfiguration data or data derived from the data is input.

The segmentation device 3 performs segmentation of a feature region using the constituent maxillofacial region and the learning model 36 or the learning model 36A which is generated in advance. The learning model 36 or the learning model 36A is a learning model which is generated using training data such that segmentation data of a feature region is output when at least one of projection data acquired through an X-ray CT scan or an MRI scan and reconfiguration data or data derived from the data is input. Accordingly, a feature region can be segmented from projection data acquired through an X-ray CT scan or an MRI scan, reconfiguration data, and the like. By performing segmentation using the learning model 36 or the learning model 36A in this way, the likelihood of improvement in segmentation accuracy increases, for example, in comparison with a case in which segmentation is mathematically performed on the basis of a CT value or a concentration value. This is useful for segmentation of tissues which are close to each other in position and CT value. With improvement in accuracy, the likelihood that a person's intervention will not be required increases.

The data of the constituent maxillofacial region input to the input unit 32 may be data of a tooth region or data of a region including the tooth region and a surrounding region thereof. Accordingly, it is possible to segment the tooth region or the region including the tooth region and the surrounding region thereof from the constituent maxillofacial region.

The segmentation data output from the learning model 36 or the learning model 36A may be segmentation data of at least one of teeth, enamel, dentine, dental pulp, dental pulp cavities, cementum, cortical bone, cancellous bone, neural tubes, blood vessels, a jawbone, and a highly X-ray absorbent material. Accordingly, it is possible to segment tissues such as teeth, enamel, dentine, dental pulp, dental pulp cavities, cementum, cortical bone, cancellous bone, neural tubes, blood vessels, and a jawbone and a highly X-ray absorbent material. For example, this configuration is useful, for example, for tissues such as cortical bone, dentine, and cancellous bone which are close to (overlap) each other in CT value.

The training data may include training data in which the data of the constituent maxillofacial region and the segmentation data of the highly X-ray absorbent material are associated with each other (see FIGS. 8A to 8E, FIGS. 9A and 9B, and the like). In this case, the learning model 36 or the learning model 36A can segment a highly X-ray absorbent material from the constituent maxillofacial region (see FIGS. 5A and 5B and the like).

The training data may include training data in which the data of the constituent maxillofacial region and the segmentation data of the tooth region are associated with each other (see FIGS. 10A, 10B, and 10C, and the like). In this case, the learning model 36 or the learning model 36A can segment the tooth region from the constituent maxillofacial region (see FIGS. 2A and 2B and the like).

The training data may include training data in which data of a region including at least the tooth region in the constituent maxillofacial region and the segmentation data of each of a plurality of biological feature regions in the tooth region are associated with each other (see FIGS. 11A to 11C, FIGS. 12A to 12C, and the like). In this case, the learning model 36 or the learning model 36A can segment each region of a plurality of biological feature regions in the tooth region from the region including at least the tooth region in the constituent maxillofacial region (see FIGS. 3A and 3B and the like).

The training data may include training data in which the data of the region including at least the tooth region and segmentation data of regions of enamel, dentine, and dental pulp in the tooth region are associated with each other (see FIGS. 11A to 11C, FIGS. 12A to 12C, and the like). In this case, the learning model can segment the regions of enamel, dentine, and dental pulp in the tooth region from the region including at least the tooth region (see FIGS. 3A and 3B and the like).

The training data may include training data in which the data of the constituent maxillofacial region and the segmentation data of the cortical bone and the alveolar bone are associated with each other (see FIGS. 13A and 13B and the like). In this case, the learning model can segment the cortical bone and the alveolar bone from the constituent maxillofacial region (see FIGS. 4A and 4B and the like). When the cortical bone and the alveolar bone which are close to each other in CT value can be segmented, segmentation of the other tissues can be easily performed.

The learning model 36 or the learning model 36A may be generated using the training data (see FIGS. 8A to 8E, FIGS. 9A and 9B, and the like) such that the segmentation data of the highly X-ray absorbent material is output (see FIGS. 5A and 5B and the like) when the data of the constituent maxillofacial region is input. Accordingly, it is possible to segment the highly X-ray absorbent material from the constituent maxillofacial region (see FIGS. 5A and 5B and the like).

The learning model 36 or the learning model 36A may be generated using the training data (see FIGS. 10A to 10C and the like) such that the segmentation data of the tooth region in the constituent maxillofacial region is output (see FIGS. 2A and 2B and the like) when the data of the constituent maxillofacial region is input. Accordingly, it is possible to segment the tooth region in the constituent maxillofacial region from the constituent maxillofacial region (see FIGS. 2A and 2B and the like).

The learning model 36 or the learning model 36A may be generated using the training data (see FIGS. 11A to 11C, FIGS. 12A to 12C, and the like) such that the segmentation data of each of the plurality of biological feature regions in the tooth region is output (see FIGS. 3A and 3B and the like) when the data of the region including at least the tooth region in the constituent maxillofacial region is input. Accordingly, it is possible to segment each of the plurality of biological feature regions in the tooth region from the region including at least the tooth region in the constituent maxillofacial region (see FIGS. 3A and 3B and the like).

The learning model 36 or the learning model 36A may be generated using the training data (see FIGS. 13A and 13B and the like) such that the segmentation data of the cortical bone and the alveolar bone is output (see FIGS. 4A and 4B and the like) when the data of the constituent maxillofacial region is input. Accordingly, it is possible to segment the cortical bone and the alveolar bone from the constituent maxillofacial region (see FIGS. 4A and 4B and the like).

When the training data includes the first training data (see FIGS. 8A to 8E, FIGS. 9A and 9B, and the like), the learning model 36 or the learning model 36A can segment a highly X-ray absorbent material from the constituent maxillofacial region (see FIGS. 5A and 5B and the like). When the training data includes the second training data (see FIGS. 10A to 10C and the like), the learning model 36 or the learning model 36A can segment a tooth region from the constituent maxillofacial region (see FIGS. 2A and 2B and the like). When the training data includes the third training data (see FIGS. 11A to 11C, FIGS. 12A to 12C, and the like), the learning model can segment each of a plurality of biological feature regions in the tooth region from the region including at least the tooth region in the constituent maxillofacial region (see FIGS. 3A and 3B and the like). When the training data includes the fourth training data (see FIGS. 13A and 13B and the like), the learning model 36 or the learning model 36A can segment cortical bone and alveolar bone from the constituent maxillofacial region (see FIGS. 4A and 4B and the like).

The learning model 36A may include at least one learning model of the learning model LM1, the learning model LM2, the learning model LM3, and the learning model LM4. When the learning model 36A includes the learning model LM1, the learning model 36A can segment the highly X-ray absorbent material from the constituent maxillofacial region (see FIGS. 5A and 5B and the like). When the learning model 36A includes the learning model LM2, the learning model 36A can segment the tooth region from the constituent maxillofacial region (see FIGS. 2A and 2B and the like). When the learning model 36A includes the learning model LM3, the learning model 36A can segment each of the plurality of biological feature regions in the tooth region from the region including at least the tooth region in the constituent maxillofacial region (see FIGS. 3A and 3B and the like). When the learning model 36A includes the learning model LM4, the learning model 36A can segment the cortical bone and the alveolar bone from the constituent maxillofacial region (see FIGS. 4A and 4B and the like).

The learning model 36A may include the learning model LM1 and the learning model LM2, and the execution unit 34 may acquire the segmentation data of the highly X-ray absorbent material by inputting the data of the constituent maxillofacial region to the learning model LM1 (Step S2a1), generate artifact reduction data in which artifacts due to the highly X-ray absorbent material have been removed or reduced using the acquired segmentation data (Step S2a2), and perform segmentation of the tooth region by inputting the generated artifact reduction data to the learning model LM2 (Step S2a3). By using the learning model LM1 and the learning model LM2 in combination in this order, the likelihood of improvement in segmentation accuracy further increases in comparison with a case in which the learning models are independently used. Particularly, since an influence of artifacts is curbed, it is possible to improve segmentation accuracy.

The learning model 36A may include the learning model LM2 and the learning model LM3, and the execution unit 34 may acquire the segmentation data of the tooth region by inputting the data of the constituent maxillofacial region to the learning model LM2 (Step S2b1), generate data of the tooth region using the acquired segmentation data (Step S2b2), and acquire segmentation data of enamel, dentine, and dental pulp and perform segmentation of the feature region by inputting the generated data of the tooth region to the learning model LM3 (Step S2b3). By using the learning model LM2 and the learning model LM3 in combination in this order, the likelihood of improvement in segmentation accuracy further increases in comparison with a case in which the learning models are independently used. Particularly, since segmentation is performed with a focus on the tooth region, it is possible to further improve segmentation accuracy in comparison with a case in which segmentation is performed along with another region (for example, cortical bone and alveolar bone).

The learning model 36A may include the learning model LM2 and the learning model LM4, and the execution unit 34 may acquire the segmentation data of the tooth region by inputting the data of the constituent maxillofacial region to the learning model LM2 (Step S2c1), perform a division process of dividing the tooth region and a region other than the tooth region in the constituent maxillofacial region using the acquired segmentation data (Step S2c2), and acquire segmentation data of the cortical bone and the alveolar bone in the region other than the tooth region and perform segmentation of the feature region by inputting the data of the constituent maxillofacial region having been subjected to the division process to the learning model LM4 (Step S2c3). By using the learning model LM2 and the learning model LM4 in combination in this order, the likelihood of improvement in segmentation accuracy further increases in comparison with a case in which the learning models are independently used. Particularly, since segmentation is performed with a focus on a region other than the tooth region, it is possible to further improve segmentation accuracy in comparison with a case in which segmentation is performed along with the tooth region.

The learning model 36 (see FIGS. 6 and 7B) or the learning model 36A (see FIG. 7A) may be provided outside of the segmentation device 3. For example, when the learning model 36 or the learning model 36A is provided in an external server (not illustrated), the segmentation device 3 may be configured to communicate with the external server. The execution unit 34 of the segmentation device 3 may use the learning model 36 or the learning model 36A in the external server by communication.

Figure 18:
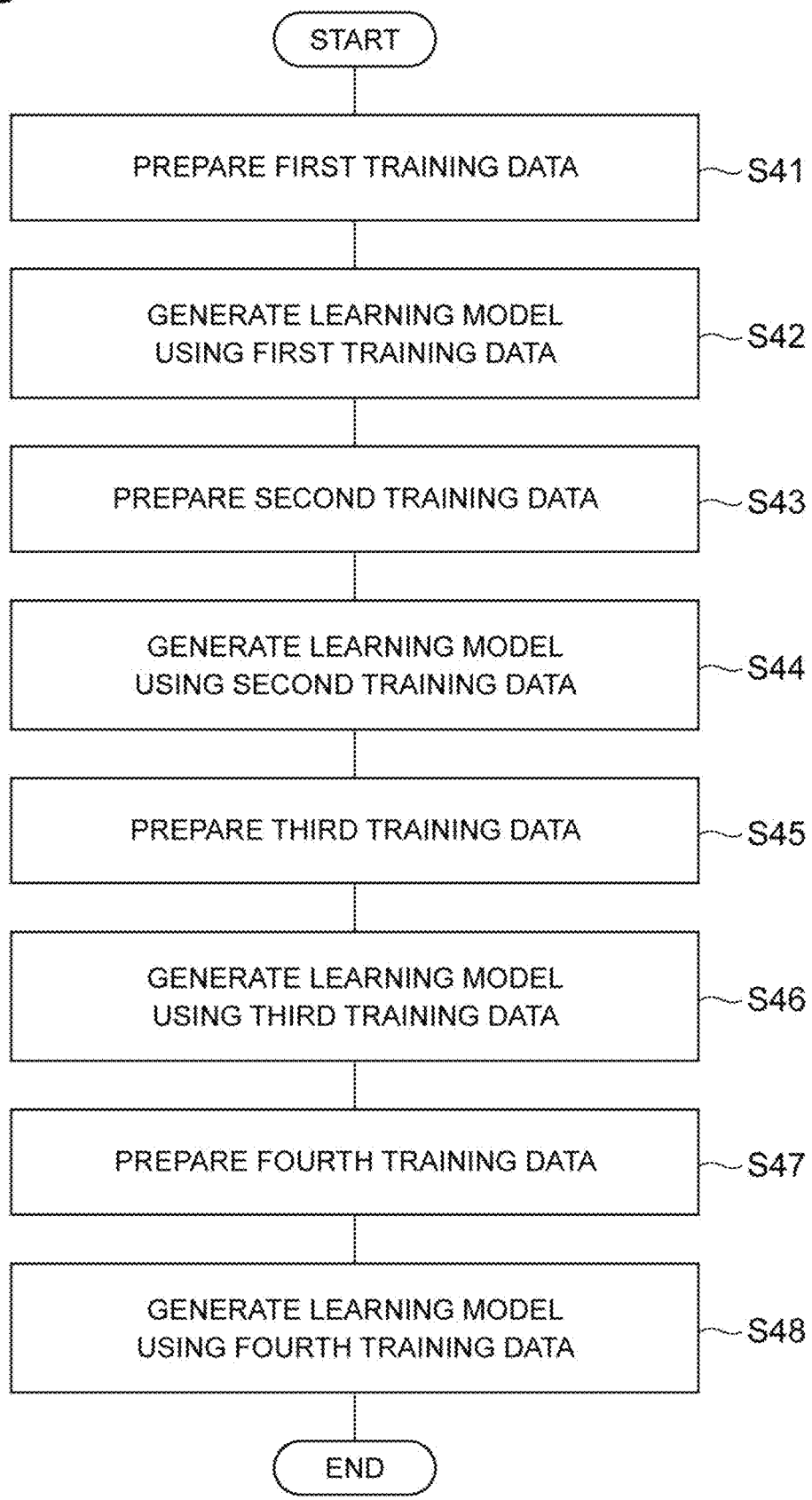
FIG. 18 is a flowchart illustrating an example of a method of generating a learning model.

FIG. 18 is a flowchart illustrating an example of a method of generating a learning model according to an embodiment.

In Step S41, first training data (see FIGS. 8A to 8E, FIGS. 9A and 9B, and the like) is prepared. The first training data may be measured data or may be data which is acquired by processing the measured data. A person's operation may intervene in preparation of training data. For example, an operation of preparing training data or the like which is performed by an expert may be included. This point associated with preparation may be the same for second to fourth training data which will be described later. An example of the first training data which is acquired by processing measured data is simulation data which is acquired by adding data of a highly X-ray absorbent material to the measured data as described above.

In Step S42, a learning model is generated using the first training data which is prepared in Step S41. Accordingly, when data of a constituent maxillofacial region is input, the learning model outputs segmentation data of the highly X-ray absorbent material. The generated learning model may be used as the learning model 36 or the learning model 36A described above (more specifically, as the learning model LM1).

In Step S43, second training data (see FIGS. 10A to 10C and the like) is prepared. The second training data may be prepared using segmentation data which is acquired by inputting the data of the constituent maxillofacial region to the learning model once. For example, training data in which artifacts due to a highly X-ray absorbent material have been removed or reduced using the segmentation data acquired by inputting the data of the constituent maxillofacial region to the trained learning model generated in Step S42 may be prepared as the second training data.

In Step S44, a learning model is generated using the second training data which is prepared in Step S43. Accordingly, when data of a constituent maxillofacial region is input, the learning model outputs segmentation data of the tooth region. The generated learning model may be used as the learning model 36 or the learning model 36A described above (more specifically, as the learning model LM2).

In Step S45, third training data (see FIGS. 11A to 11C, FIGS. 12A to 12C, and the like) is prepared. The third training data may be prepared using segmentation data of the tooth region. The segmentation data of the tooth region may be acquired by inputting the data of the constituent maxillofacial region to the trained learning model generated in Step S44. Training data in which artifacts due to a highly X-ray absorbent material have been removed or reduced using the segmentation data acquired by inputting the data of the region including at least the tooth region to the trained learning model generated in Step S42 may be prepared as the third training data.

In Step S46, a learning model is generated using the third training data which is prepared in Step S45. Accordingly, when at least the data of the region including at least the tooth region in the constituent maxillofacial region is input, the learning model outputs segmentation data of each of a plurality of biological feature regions in the tooth region. The generated learning model may be used as the learning model 36 or the learning model 36A described above (more specifically, as the learning model LM3).

In Step S47, fourth training data (see FIGS. 13A and 13B and the like) is prepared. The fourth training data may be prepared using segmentation data of the tooth region. The segmentation data of the tooth region may be acquired by inputting the data of the constituent maxillofacial region to the trained learning model generated in Step S44. Training data in which artifacts due to a highly X-ray absorbent material have been removed or reduced using the segmentation data acquired by inputting the data of the constituent maxillofacial region to the trained learning model generated in Step S42 may be prepared as the fourth training data.

In Step S48, a learning model is generated using the fourth training data which is prepared in Step S47. Accordingly, when at least the data of the constituent maxillofacial region is input, the learning model outputs segmentation data of cortical bone and alveolar bone. The generated learning model may be used as the learning model 36 or the learning model 36A described above (more specifically, as the learning model LM4).

All the processes of Steps S41 to S48 do not have to be performed. For example, when the training data does not include the first training data, the processes of Steps S41 and S42 may be skipped. When the training data does not include the second training data, the processes of Steps S43 and S44 may be skipped. When the training data does not include the third training data, the processes of Steps S45 and S46 may be skipped. When the training data does not include the fourth training data, the processes of Steps S47 and S48 may be skipped.

The above-mentioned method of generating a learning model can be defined, for example, as follows. That is, the method of generating a learning model includes at least one of: generating the learning model using the first training data (see FIGS. 8A to 8E, FIGS. 9A and 9B, and the like) (Step S42); generating the learning model using the second training data (see FIGS. 10A to 10C and the like) (Step S44); generating the learning model using the third training data (see FIGS. 11A to 11C, FIGS. 12A to 12C, and the like) (Step S46); and generating the learning model using the fourth training data (see FIGS. 13A and 13B and the like) (Step S48).

With this method of generating a learning model, it is possible to obtain the learning model 36 or the learning model 36A which is generated using at least one of the first training data (see FIGS. 8A to 8E, FIGS. 9A and 9B, and the like), the second training data (see FIGS. 10A to 10C and the like), the third training data (see FIGS. 11A to 11C, FIGS. 12A to 12C, and the like), and the fourth training data (see FIGS. 13A and 13B and the like).

The method of generating a learning model may include: when the training data includes the second training data (see FIGS. 10A to 10C and the like), the third training data (see FIGS. 11A to 11C, FIGS. 12A to 12C, and the like), and the fourth training data (see FIGS. 13A and 13B and the like), a step of preparing the second training data (see FIGS. 10A to 10C and the like) using segmentation data which is acquired by inputting the data of the constituent maxillofacial region to the learning model (Step S43); a step of training the learning model using the prepared second training data (see FIGS. 10A to 10C and the like) (Step S44); a step of acquiring the segmentation data of the tooth region by inputting the data of the constituent maxillofacial region to the learning model trained using the second training data (see FIGS. 10A to 10C and the like) (Steps S45 and S47), and the method may further include one of steps (a), (b), and (c):

(a) a step of preparing the third training data (see FIGS. 11A to 11C, FIGS. 12A to 12C, and the like) using the segmentation data of the tooth region (Step S45) and a step of training the learning model using the prepared third training data (see FIGS. 11A to 11C, FIGS. 12A to 12C, and the like) (Step S46);

(b) a step of preparing the fourth training data (see FIGS. 13A and 13B and the like) using the segmentation data of the tooth region (Step S47) and a step of training the learning model using the prepared fourth training data (see FIGS. 13A and 13B and the like) (Step S48); and (c) a step of preparing the third training data (see FIGS. 11A to 11C, FIGS. 12A to 12C, and the like) using the segmentation data of the tooth region (Step S45), a step of training the learning model using the prepared third training data (see FIGS. 11A to 11C, FIGS. 12A to 12C, and the like) (Step S46), a step of preparing the fourth training data (see FIGS. 13A and 13B and the like) using the segmentation data which is acquired by inputting the data of the constituent maxillofacial region to the learning model trained using the third training data (see FIGS. 11A to 11C, FIGS. 12A to 12C, and the like) (Step S47), and a step of training the learning model using the prepared fourth training data (see FIGS. 13A and 13B and the like) (Step S48).

In this way, by performing learning using the second training data (see FIGS. 10A to 10C and the like), learning using the third training data (see FIGS. 11A to 11C, FIGS. 12A to 12C, and the like), and learning using the fourth training data (see FIGS. 13A and 13B and the like) in various combinations, the likelihood of improvement in segmentation accuracy further increases in comparison with a case in which the learning is independently performed.

The method of generating a learning model may include: a step of preparing the first training data (see FIGS. 8A to 8E, FIGS. 9A and 9B, and the like) (Step S41) before a step of preparing the second training data (see FIGS. 10A to 10C and the like) (Step S43); and a step of training the learning model using the prepared first training data (see FIGS. 8A to 8E, FIGS. 9A and 9B, and the like) (Step S42) before the step of preparing the second training data (see FIGS. 10A to 10C and the like) (Step S43). The step of preparing the second training data (see FIGS. 10A to 10C and the like) (Step S43), a step of preparing the third training data (see FIGS. 11A to 11C, FIGS. 12A to 12C, and the like) (Step S45), and a step of preparing the fourth training data (see FIGS. 13A and 13B and the like) (Step S47) may include preparing training data in which artifacts due to a highly X-ray absorbent material have been removed or reduced using segmentation data which is acquired by inputting data of the region including at least the tooth region to the learning model. In this case, the learning model can segment a feature region from data in which artifacts have been removed or reduced. By using such learning models for the data in which artifacts have been removed or reduced, since an influence of artifacts is curbed, it is possible to further increase the likelihood of improvement in segmentation accuracy.

Figure 19:
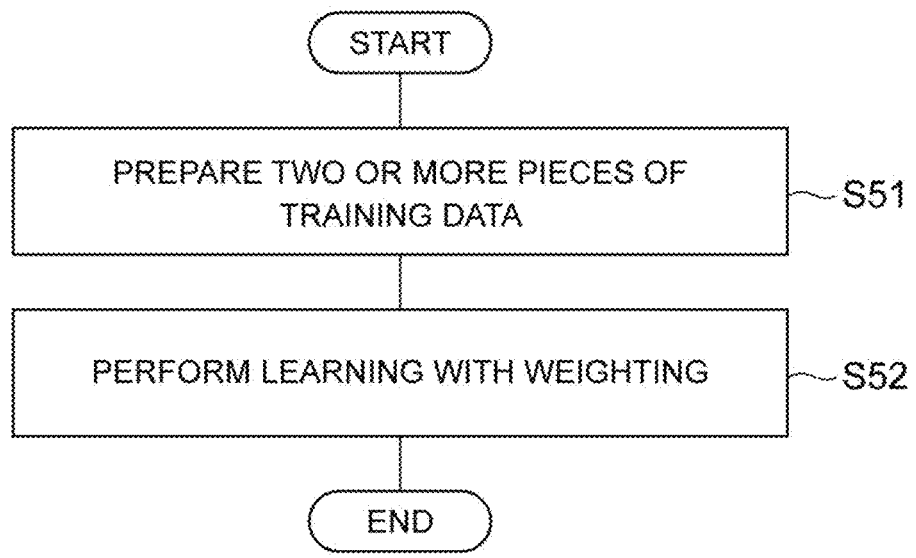
FIG. 19 is a flowchart illustrating an example of a method of generating a learning model.

When a learning model is generated using a plurality of pieces of training data, learning using each piece of training data may be weighted. FIG. 19 is a flowchart illustrating an example of the method of generating the learning models.

In Step S51, a plurality of pieces of training data are prepared. Examples of the plurality of pieces of training data include at least two pieces of training data of the first training data (see FIGS. 8A to 8E, FIGS. 9A and 9B, and the like), the second training data (see FIGS. 10A to 10C and the like), the third training data (see FIGS. 11A to 11C, FIGS. 12A to 12C, and the like), and the fourth training data (see FIGS. 13A and 13B and the like) which are described above.

In Step S52, training of the learning model is performed weighting and using the plurality of pieces of training data in Step S52. In the training, for example, when segmentation of a highly X-ray absorbent material is considered as being important, weighting is performed such that a loss based on a difference between an output of the first learning model and the first training data is greater than a loss based on a difference between an output of the other learning model and the training data, and training is performed such that the former difference decreases.

Similarly, when one segmentation is considered as being important, weighting is performed such that a loss based on a difference between an output of one learning model and one training data corresponding to the one learning model is greater than a loss based on a difference between an output of the other learning model and the corresponding training data, and training is performed such that the former difference decreases.

The method of generating a learning model may include: a step of preparing the first training data, the second training data, the third training data, and the fourth training data (Step S51); and a step of training the learning model by weighting and using the prepared first training data, the prepared second training data, the prepared third training data, and the prepared fourth training data (Step S52). It is possible to generate a learning model which is particularly suitable for a segmentation region considered as being important through weighting. For example, by performing weighting such that a loss based on a difference between the output of the first learning model and the first training data is greater than a loss based on a difference between the output of the other learning model and the corresponding training data and performing training such that the former difference decreases, it is particularly possible to generate a learning model with improved segmentation accuracy of a highly X-ray absorbent material. By performing weighting such that a loss based on a difference between the output of the second learning model and the second training data is greater than a loss based on a difference between the output of the other learning model and the corresponding training data and performing training such that the former difference decreases, it is particularly possible to generate a learning model with improved segmentation accuracy of a tooth region. By performing weighting such that a loss based on a difference between the output of the third learning model and the third training data is greater than a loss based on a difference between the output of the other learning model and the corresponding training data and performing training such that the former difference decreases, it is particularly possible to generate a learning model with improved segmentation accuracy of each of a plurality of biological feature regions, more specifically, each region of enamel, dentine, and dental pulp in the tooth region. By performing weighting such that a loss based on a difference between the output of the fourth learning model and the fourth training data is greater than a loss based on a difference between the output of the other learning model and the corresponding training data and performing training such that the former difference decreases, it is particularly possible to generate a learning model with improved segmentation accuracy of cortical bone and alveolar bone.

The above-mentioned weighting process may be incorporated into the learning of the method of generating a learning model which has been described above with reference to FIG. 18.

Figure 20:
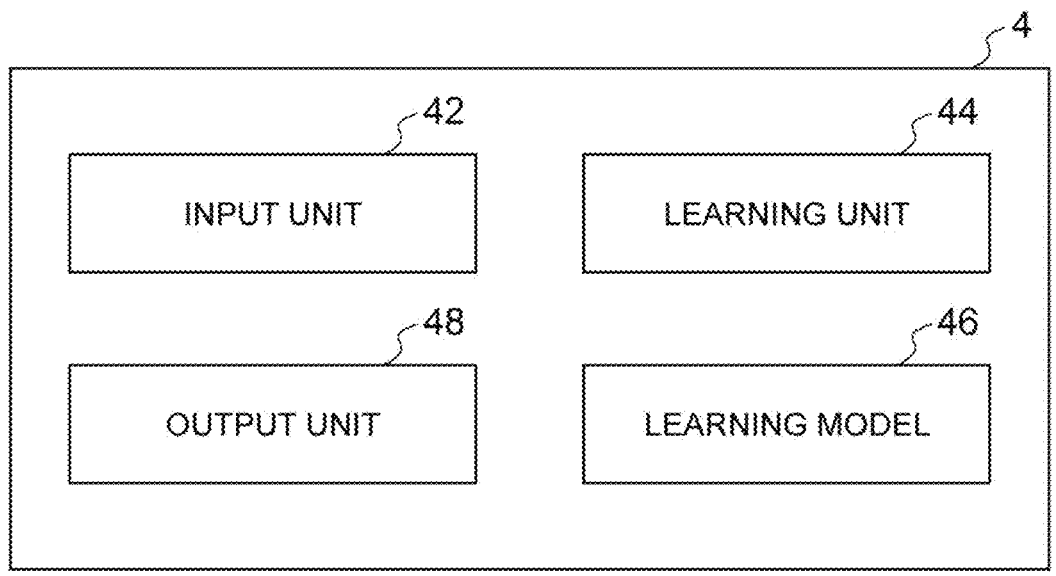
FIG. 20 is a diagram illustrating an example of functional blocks of a learning device.

Generation of a learning model can be performed, for example, using a learning device. A learning device may be a computer device including a processor (such as a CPU) and a memory (such as a ROM and a RAM). In the example illustrated in FIG. 20, a learning device 4 includes an input unit 42, a learning unit 44, a learning model 46, and an output unit 48 as functional blocks. The learning unit 44 performs training of the learning model 46 using training data which is input to the input unit 42. The learning model 46 is output from the output unit 48.

For example, in Step S42 in FIG. 18 described above, the first training data (see FIGS. 8A to 8E, FIGS. 9A and 9B, and the like) is input to the input unit 42. The learning unit 44 performs training of the learning model 46 using the first training data (see FIGS. 8A to 8E, FIGS. 9A and 9B, and the like) input to the input unit 42. The learning model 46 is output (taken out) from the output unit 48. The output learning model 46 may be implemented as the learning model 36 or the learning model 36A (more specifically, the learning model LM1) in the segmentation device 3. In Step S43, the second training data (see FIGS. 10A to 10C and the like) may be prepared using the trained learning model 46 output (taken out) from the output unit 48.

In Step S44 in FIG. 18 described above, the second training data (see FIGS. 10A to 10C and the like) is input to the input unit 42. The learning unit 44 performs training of the learning model 46 using the second training data (see FIGS. 10A to 10C and the like) input to the input unit 42. The learning model 46 is output from the output unit 48. The output learning model 46 may be implemented as the learning model 36 or the learning model 36A (more specifically, the learning model LM2) in the segmentation device 3. In Step S45, the third training data (see FIGS. 11A to 11C, FIGS. 12A to 12C, and the like) may be prepared using the trained learning model 46 output from the output unit 48.

In Step S46 in FIG. 18 described above, the third training data (see FIGS. 11A to 11C, FIGS. 12A to 12C, and the like) is input to the input unit 42. The learning unit 44 performs training of the learning model 46 using the third training data (see FIGS. 11A to 11C, FIGS. 12A to 12C, and the like) input to the input unit 42. The learning model 46 is output from the output unit 48. The output learning model 46 may be implemented as the learning model 36 or the learning model 36A (more specifically, the learning model LM3) in the segmentation device 3. In Step S47, the fourth training data (see FIGS. 13A and 13B and the like) may be prepared using the trained learning model 46 output from the output unit 48.

In Step S48 in FIG. 18 described above, the fourth training data (see FIGS. 13A and 13B and the like) is input to the input unit 42. The learning unit 44 performs training of the learning model 46 using the fourth training data (see FIGS. 13A and 13B and the like) input to the input unit 42. The learning model 46 is output from the output unit 48. The output learning model 46 may be implemented as the learning model 36 or the learning model 36A (more specifically, the learning model LM4) in the segmentation device 3.

Figure 21:
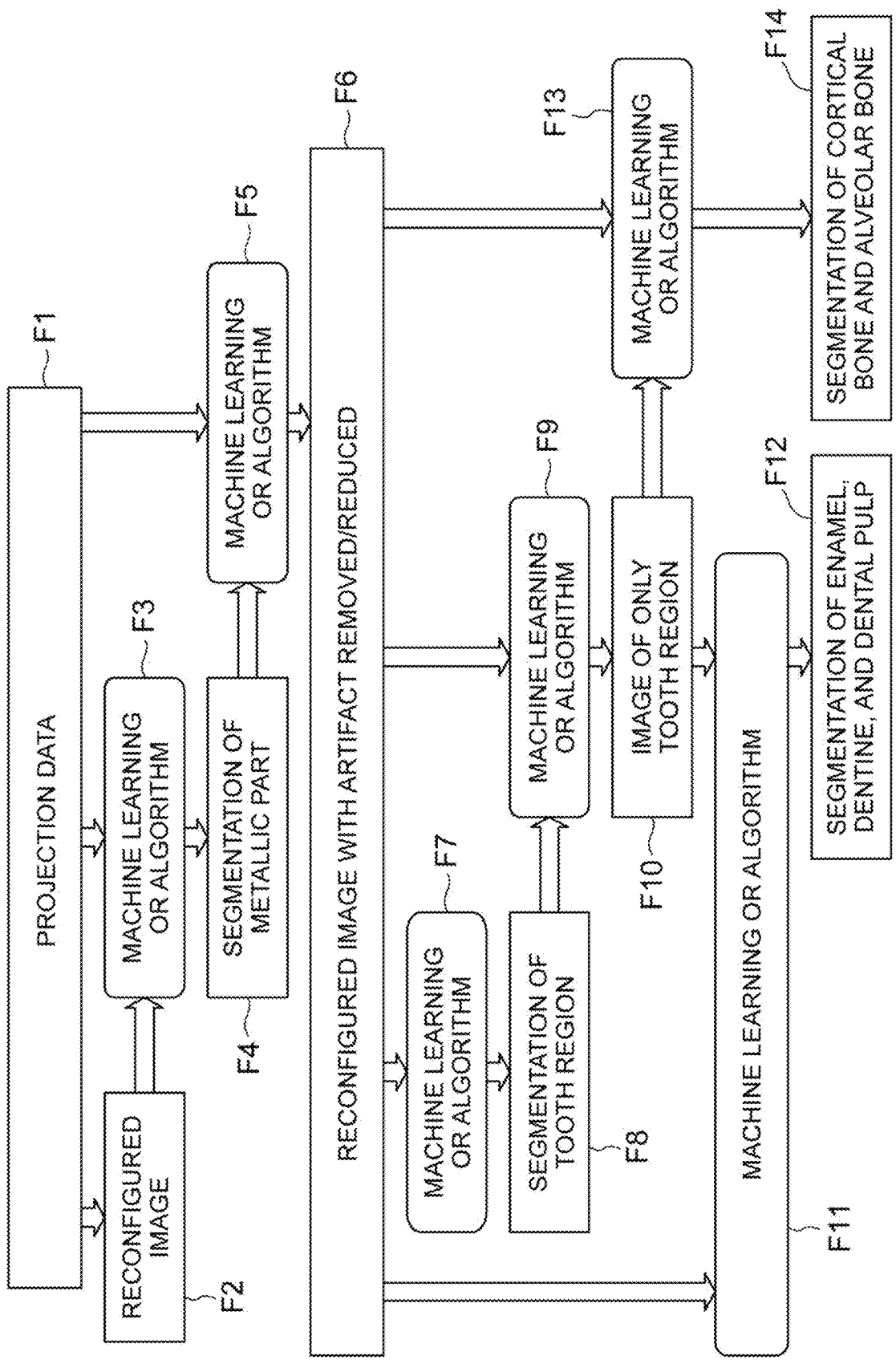
FIG. 21 is an inference flow illustrating an example of a whole image.
Figure 22:
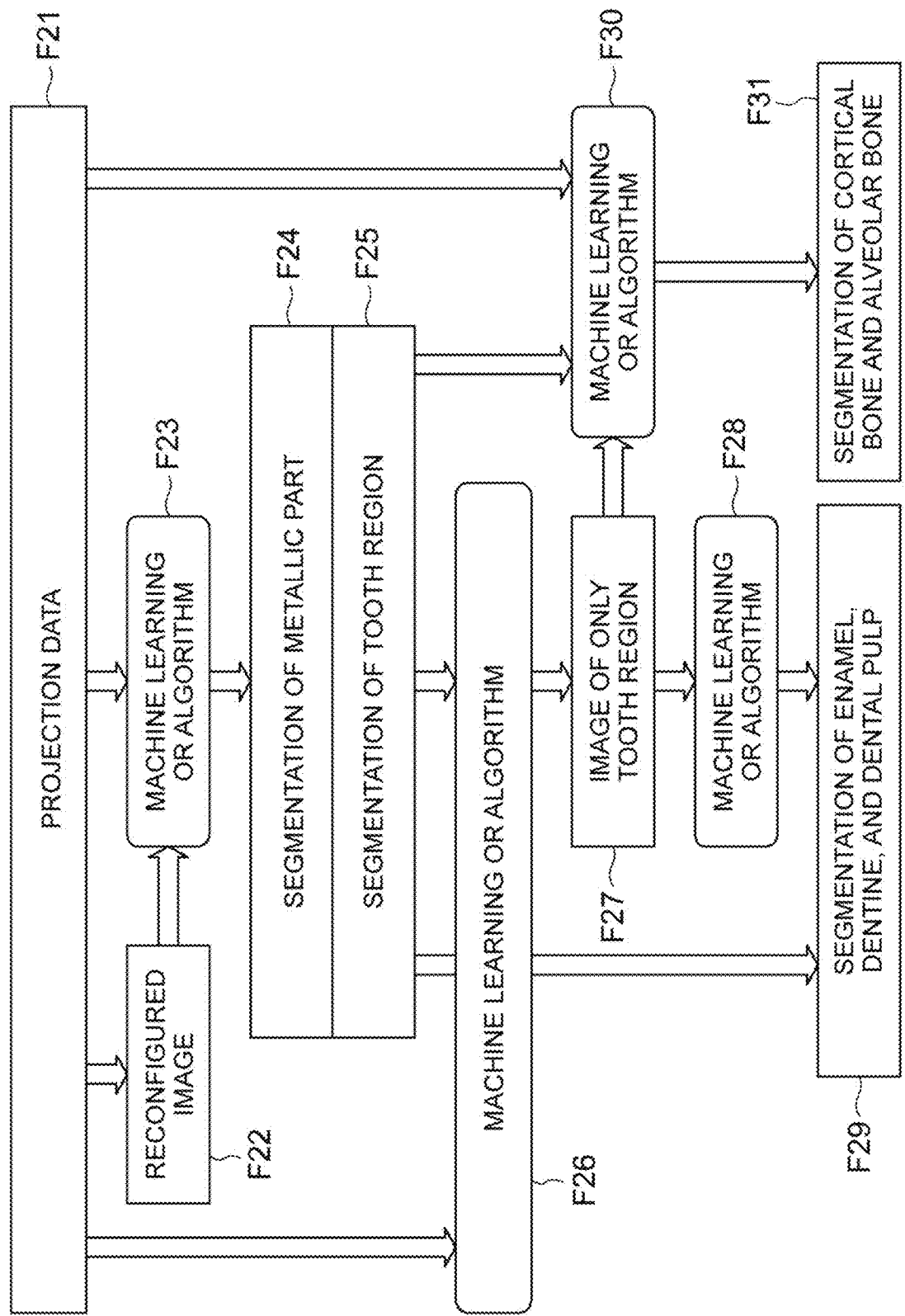
FIG. 22 is an inference flow illustrating an example of a whole image.

While some embodiments of the present disclosure have been described above, the present disclosure is not limited to the embodiments. For example, some processes using a learning model may be replaced with processes using an algorithm. Here, the algorithm refers to an algorithm not using a learning model. Various known algorithms depending on usage may be used as the algorithm. On the other hand, some processes using an algorithm may be replaced with processes using a learning model. An example of the whole image including various variations will be described below with reference to FIGS. 21 and 22. In FIGS. 21 and 22, a learning model which has been generated using machine learning as described above and learning which has been performed to generate the learning model is referred to and illustrated as "machine learning." That is, "machine learning" in FIGS. 21 and 22 is used in a concept including both a learning model and a learning operation.

In the example of an inference flow illustrated in FIG. 21, a flow F1 represents acquisition of projection data. For example, projection data acquired by the imaging device 2 described above is input to the input unit 32 of the segmentation device 3.

A flow F2 represents a reconfigured image based on the projection data acquired in the flow F1. The reconfigured image is acquired by designating an arbitrary position (such as a tomographic plane) of reconfiguration data. The reconfiguration data is generated using the projection data as described above. Examples of the reconfigured image include the images illustrated in FIGS. 2A, 3A, 4A, and 5A.

A flow F3 represents machine learning or an algorithm using the projection data acquired in the flow F1. In the flow F3, machine learning may be performed additionally using the reconfigured image acquired in the flow F2. For example, it may be difficult to determine a metallic part in the projection data acquired in the flow F1 and it may be easy to determine a metallic part in the reconfigured image acquired in the flow F2. In this case, position information of a metallic part acquired by the reconfigured image can be used to identify the metallic part in the projection data. In the flow F3, whether to segment the metallic part may be determined on the basis of a degree of generation of artifacts in the reconfigured image acquired in the flow F2 and the result of determination may be sent to a flow F5 which will be described later. This machine learning or algorithm is configured to extract or annotate the metallic part. For example, at least the first training data (see FIGS. 8A to 8E, FIGS. 9A and 9B, and the like) described above is used for the machine learning. Various known algorithms may be used as the algorithm.

A flow F4 represents segmentation of the metallic part using the machine learning or algorithm in the flow F3. Segmentation of the metallic part is performed on the projection data acquired in the flow F1 using the machine learning or algorithm in the flow F2. For example, the images illustrated in FIGS. 8B and 9B are acquired by this segmentation of the metallic part.

The flow F5 represents machine learning or an algorithm using the segmentation of a metallic part in the flow F4. This machine learning or algorithm is configured to remove or reduce artifacts. Training data in which a metallic part, a part other than the metallic part, and an image process to be performed are associated with each other such that a reconfigured image in which artifacts have been removed or reduced is generated by performing an image process using the segmentation of the metallic part in the flow F4 on the projection data acquired in the flow F1 may be used for the machine learning in this case. A specific example of the image process is a process of replacing a concentration with an appropriate concentration with reference to the part other than the metallic part such that the metallic part does not cause generation of artifacts. Various known algorithms may be used as the algorithm.

A flow F6 represents acquisition of a reconfigured image in which artifacts have been removed or reduced. When there are no artifacts or sufficiently slight artifacts in the reconfigured image in the flow F2, the reconfigured image in the flow F2 may be the reconfigured image acquired in the flow F6. Otherwise, the reconfigured image in which artifacts have been removed or reduced is acquired using the reconfigured image in the flow F2 and the machine learning or algorithm in the flow F5.

A flow F7 represents machine learning using the reconfigured image in which artifacts have been removed or reduced and which are acquired in the flow F6. This machine learning is configured to perform segmentation of teeth. For example, at least the second training data (see FIGS. 10A to 10C and the like) described above may be used for the machine learning.

A flow F8 represents segmentation of teeth using the machine learning in the flow F7. For example, the image illustrated in FIG. 10B is acquired through this segmentation of teeth.

A flow F9 represents machine learning or an algorithm using the segmentation of teeth in the flow F8. This machine learning or algorithm is configured to generate an image of only teeth on the basis of the reconfigured image in which artifacts have been removed or reduced in the flow F6 and the result of segmentation of teeth in the flow F8. For example, the image of only teeth is obtained by extracting a part of teeth in the result of segmentation of teeth in the flow F8 from the reconfigured image in the flow F6.

A flow F10 represents acquisition of an image of only teeth using the machine learning or algorithm in the flow F9.

A flow F11 represents machine learning or an algorithm using the reconfiguration data in which artifacts have been removed or reduced in the flow F6 or the image of only teeth in the flow F10. This machine learning or algorithm is configured to perform segmentation of enamel, dentine, and dental pulp. For example, at least the third training data (see FIGS. 11A to 11C, FIGS. 12A to 12C, and the like) described above may be used for the machine learning. Various known algorithms may be used as the algorithm. Cementum may be included as a segmentation object as described above and thus detailed description thereof will be omitted.

A flow F12 represents segmentation of enamel, dentine, and dental pulp using the machine learning or algorithm in the flow F11. For example, the images illustrated in FIGS. 11B and 12B are obtained by segmentation of enamel, dentine, and dental pulp. Cementum may be included as a segmentation object as described above and thus detailed description thereof will be omitted.

A flow F13 represents machine learning or an algorithm using the reconfigured image in which artifacts have been removed or reduced in the flow F6 or the image of only teeth in the flow F10. This machine learning or algorithm is configured to perform segmentation of cortical bone and alveolar bone. For example, at least the fourth training data (see FIGS. 13A and 13B and the like) described above may be used for the machine learning. Various known algorithms may be used as the algorithm.

A flow F14 represents segmentation of cortical bone and alveolar bone using the machine learning or algorithm in the flow F13. For example, the image illustrated in FIG. 13B is obtained by the segmentation of cortical bone and alveolar bone.

Another example of the inference flow illustrated in FIG. 22 will be described below. A flow F21 is the same as the flow F1 (see FIG. 21) described above. That is, the flow F21 represents acquisition of projection data.

A flow F22 is the same as the flow F3 (see FIG. 21) described above. That is, the flow F22 represents a reconfigured image based on the projection data acquired in the flow F21.

A flow F23 represents machine learning using the projection data acquired in the flow F21 or the reconfigured image in the flow F22. This machine learning is configured to perform segmentation of teeth and segmentation of a metal. For example, at least the first training data (see FIGS. 8A to 8E, FIGS. 9A and 9B, and the like) and the second training data (see FIGS. 10A to 10C and the like) described above may be used for the machine learning. Which projection data of the projection data in the flow F1 is to be used (is used as an input candidate) may be appropriately determined.

A flow F24 represents segmentation of a metallic part using the machine learning or algorithm in the flow F23. For example, the images illustrated in FIGS. 8B and 9B are obtained by the segmentation of a metallic part.

A flow F25 represents segmentation of teeth using the machine learning in the flow F23. For example, the image illustrated in FIG. 10B is obtained by the segmentation of teeth.

A flow F26 represents machine learning or an algorithm using the results of the flows F24 and F25. This machine learning or algorithm is configured to perform removal or reduction of artifacts using the segmentation data of the metallic part in the flow F24 and generation of an image of only teeth using the segmentation data of teeth in the flow F25 in an image reconfiguration process of the projection data in the flow F21.

A flow F27 represents acquisition of an image of only teeth using the machine learning or algorithm in the flow F26.

A flow F28 is the same as the above-mentioned flow F11 (see FIG. 21). That is, the flow F28 represents machine learning or an algorithm equivalent to the machine learning or algorithm using the image of only teeth in the flow F10.

A flow F29 is the same as the above-mentioned flow F12 (see FIG. 21). That is, the flow F29 represents segmentation of enamel, dentine, and dental pulp using the machine learning or algorithm in the flow F28.

A flow F30 represents machine learning or an algorithm configured to perform removal or reduction of artifacts using the segmentation data of the metallic part in the flow F24 and to use the segmentation data of teeth in the flow F25 or the image of only teeth in the flow F27 in the image reconfiguration process of the projection data in the flow F21. This machine learning or algorithm is configured to perform segmentation of cortical bone and alveolar bone. For example, at least the fourth training data (see FIGS. 13A and 13B and the like) described above may be used for the machine learning. Various known algorithms may be used as the algorithm.

A flow F31 represents segmentation of cortical bone and alveolar bone using the machine learning or algorithm in the flow F30. For example, the image illustrated in FIG. 13B is obtained by the segmentation of cortical bone and alveolar bone.

An additional embodiment of the segmentation device 3 will be described below. When the execution unit 34 which has been described above with reference to FIG. 6 and the like performs segmentation of elements (enamel, dentine, and dental pulp) and segmentation of alveolar bone (cortical bone and cancellous bone) of a jawbone using the learning model 36 or the learning model 36A (see FIGS. 7A and 7B), the execution unit 34 may measure an absorbance of the alveolar bone. The result of measurement of an absorbance of alveolar bone is provided, for example, for diagnosis and support of a periodontal disease.

Figure 23:
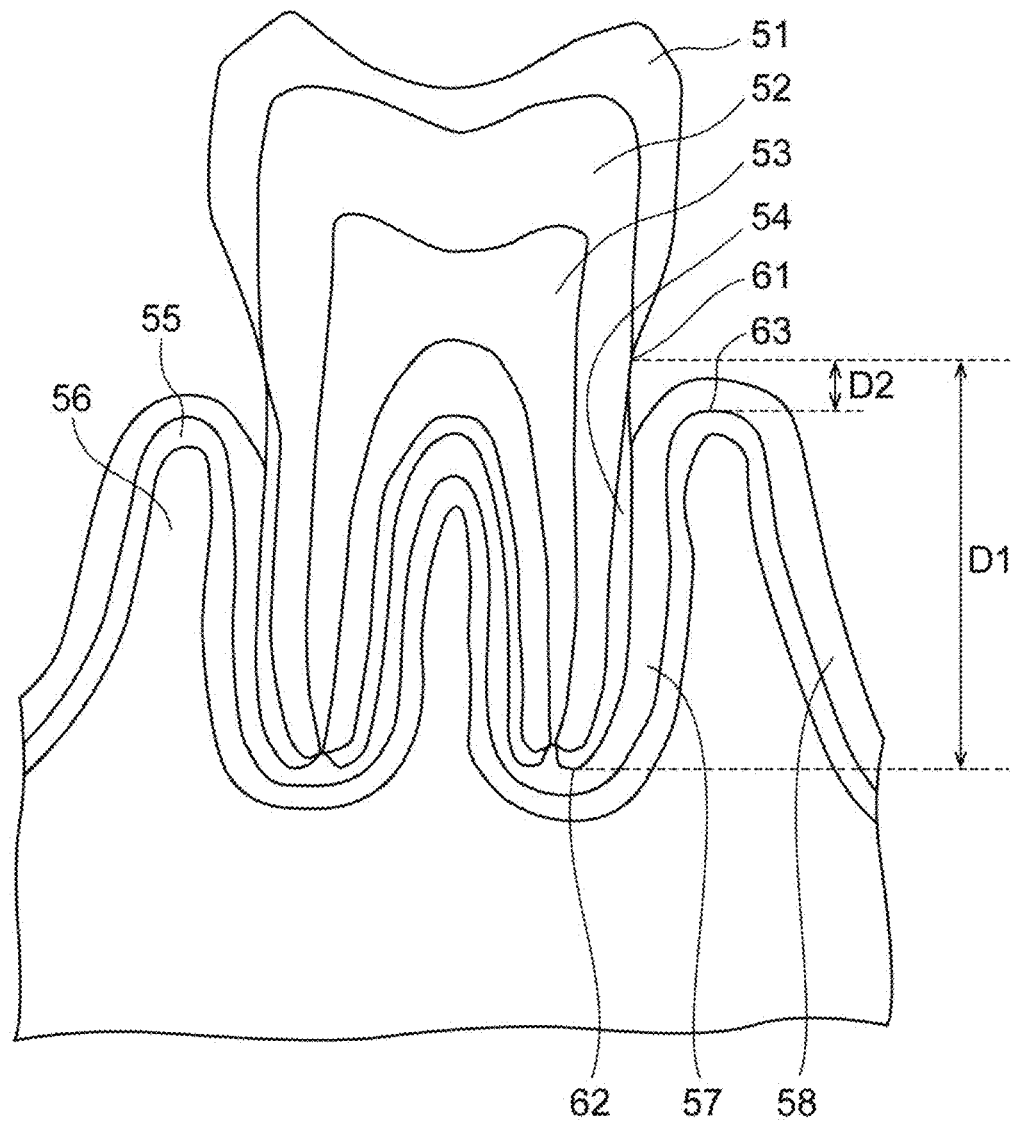
FIG. 23 is a diagram illustrating an example of measurement of an absorbance of alveolar bone.

A technique of measuring an absorbance of alveolar bone will be described below with reference to FIG. 23. FIG. 23 is a diagram schematically illustrating a sectional plane (a sectional plane when seen from a direction crossing a curve of a dental arch) of teeth and surroundings thereof. Enamel is referred to and illustrated as an enamel 51. Dentine is referred to and illustrated as a dentine 52. Dental pulp is referred to and illustrated as a dental pulp 53. Cementum is referred to and illustrated as a cementum 54. Cortical bone is referred to and illustrated as a cortical bone 55. Cancellous bone is referred to and illustrated as a cancellous bone 56. The cancellous bone 56 constitutes alveolar bone. A boundary between the enamel 51 and the dentine 52 is referred to and illustrated as a boundary 61. A root apex of alveolar bone (a periodontal tip) is referred to and illustrated as a root apex 62. An alveolar crest is referred to and illustrated as an alveolar crest 63. Position information of these elements is acquired by the above-mentioned segmentation. FIG. 23 also illustrates a periodontal region 57 and a gingival region 58.

The execution unit 34 calculates distances between the elements on the basis of position information of the elements. Specifically, the execution unit 34 calculates a distance D1 (a first distance) between the boundary 61 and the root apex 62 and a distance D2 (a second distance) between the boundary 61 and the alveolar crest 63. Then, the execution unit 34 calculates an absorbance of alveolar bone on the basis of a ratio of the distance D2 to the distance D1. In this example, the distance D1 and the distance D2 are lengths in the vertical direction. The execution unit 34 calculates a value obtained by dividing the distance D2 by the distance D1 as the ratio R. That is, R=D2/D1 is calculated. As the calculated ratio R becomes greater, it means that absorption of alveolar bone (a state in which a bone tissue disappears) progresses more. In this way, an absorbance of alveolar bone is measured. The measured absorbance of alveolar bone or various types of information thereon may be presented by the output unit 38.

Figure 24A:
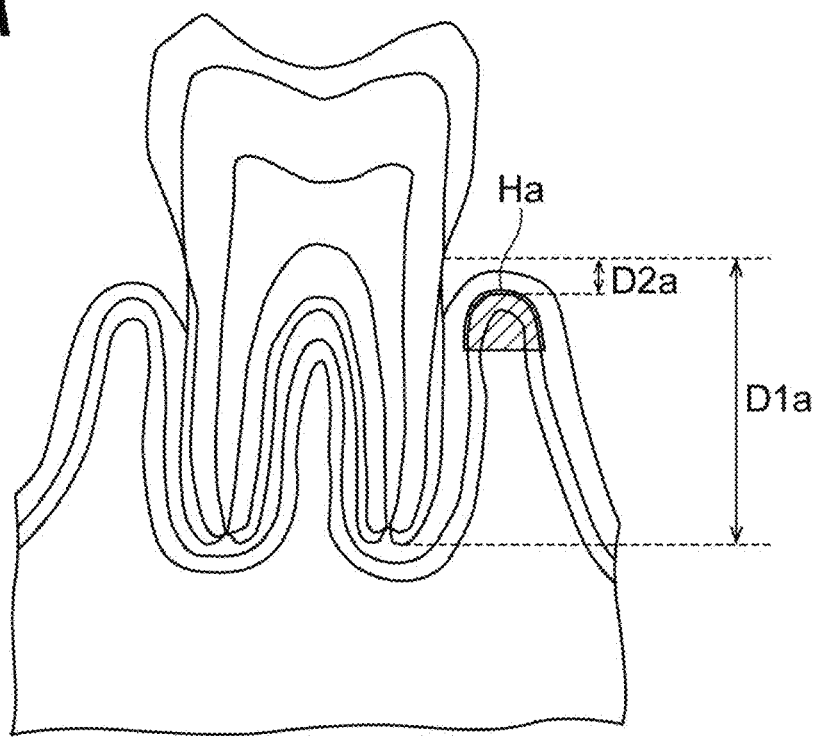
FIGS. 24A and 24B are diagrams illustrating an example of measurement of an absorbance of alveolar bone.
Figure 24B:
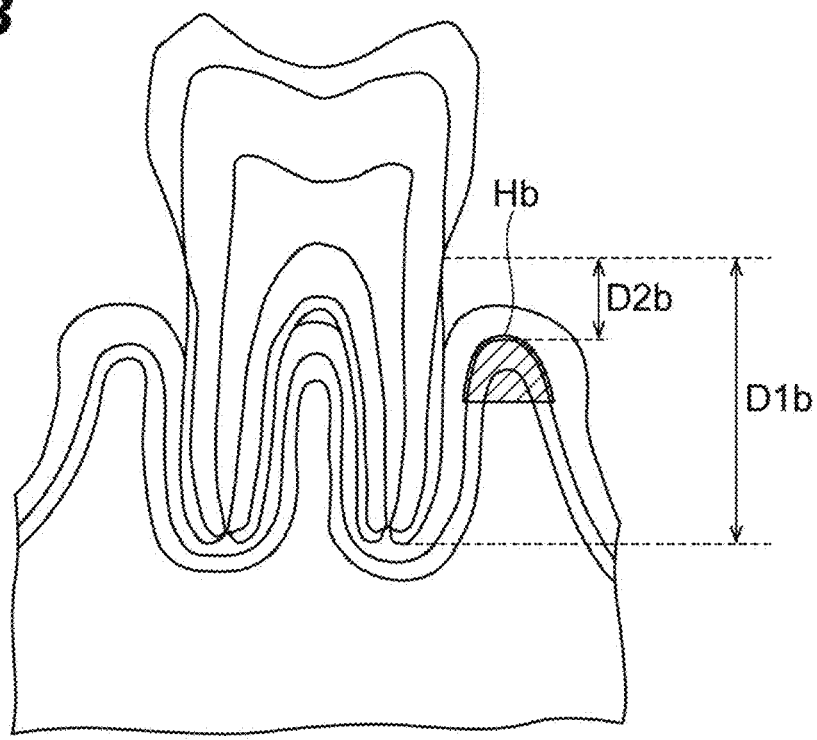

For example, an image in which a heat map is combined with the image illustrated in FIG. 23 may be presented by the output unit 38. In the example illustrated in FIG. 24A, a place Ha in which R=D2$a$/D1$a$ is satisfied and absorption of alveolar bone progresses is illustrated in a heat map manner. In the example illustrated in FIG. 24B, a place Hb in which R=D2$b$/D1$b$ is satisfied and absorption of alveolar bone progresses is illustrated in a heat map manner. The absorbance of alveolar bone in the place Hb illustrated in FIG. 24B is greater than that in the place Ha illustrated in FIG. 24A (R is greater). In this case, the heat map indicating the place Hb may be emphasized and displayed (for example, displayed in darker red) more than that of the place Ha. In this way, a degree of progress (a risk) of absorption of alveolar bone may be notified.

When the absorbance of alveolar bone is measured as described above, it is necessary to find out a sectional plane from which the distance D1 between the boundary 61 and the root apex 62 and the distance D2 between the boundary 61 and the alveolar crest 63 can be seen. This sectional plane can be found out, for example, by observing a sectional plane taken along a direction crossing a curve of a dental arch and observing the sectional plane while moving it in a mesio-distal direction. Learning for finding out the sectional plane may be performed on the learning model 36 or the learning model 36A. Training data in which three-dimensional volume data acquired by a CT scan or an MRI scan and a sectional (slice) position are associated with each other may be used for the machine learning in this case.

When measurement of the absorbance of alveolar bone is performed on all the teeth, measurement of the absorbance of alveolar bone of all the teeth is accurately and automatically performed. Accordingly, it is possible to easily diagnose and support slight periodontitis to severe periodontitis on the basis of an absorbance, a heat map, or the like. The diagnosis and support may be performed using a neural network (for example, a learning model acquired by training the learning model 36 or the learning model 36A) which has been trained using data of a periodontal disease as the training data.

That is, in the segmentation device 3, the execution unit 34 acquires segmentation data of the enamel 51, the dentine 52, and the alveolar bone (the cancellous bone 56) using the data of the constituent maxillofacial region input to the input unit 32 and the learning model 36 or the learning model 36A, and calculates an absorbance of alveolar bone on the basis of the acquired segmentation data. Accordingly, it is possible to measure an absorbance of alveolar bone.

The execution unit 34 may calculate an absorbance of alveolar bone on the basis of the ratio R of the distance D2 from the boundary 61 between the enamel 51 and the dentine 52 to the alveolar crest 63 to the distance D1 from the boundary 61 to the root apex 62 of the alveolar bone in the acquired segmentation data of the enamel 51, the dentine 52, and the alveolar bone (the cancellous bone 56). In this way, it is possible to calculate an absorbance of alveolar bone.

What is claimed is:

1. A segmentation device comprising:
an input interface configured to receive an input of data of a constituent maxillofacial region which is at least a part of a maxillofacial region;
a processor configured to perform segmentation of a feature region which is at least one of a biological feature region and an artificial feature region included in the constituent maxillofacial region using the data of the constituent maxillofacial region input to the input interface and a previously generated learning model; and
an output interface configured to output a result of execution from the processor,
wherein the learning model is a model which is generated using training data such that segmentation data of the feature region is output when at least one of projection data and reconfiguration data acquired by an X-ray CT scan or an MRI scan, or data derived from the at least one of projection data and reconfiguration data is input;
wherein the training data includes:
first training data in which the data of the constituent maxillofacial region and segmentation data of a metal as a highly X-ray absorbent material are associated with each other, and
second training data in which the data of the constituent maxillofacial region and segmentation data of a tooth region are associated with each other;
wherein the learning model includes:
a first learning model which is generated using the first training data such that the segmentation data of the metal as the highly X-ray absorbent material is output when the data of the constituent maxillofacial region is input, and
a second learning model which is generated using the second training data such that the segmentation data of the tooth region is output when the data of the constituent maxillofacial region is input; and
wherein the processor is configured to:
acquire the segmentation data of the metal as the highly X-ray absorbent material by inputting the data of the constituent maxillofacial region to the first learning model,
generate artifact reduction data in which artifacts due to the metal as the highly X-ray absorbent material have been removed or reduced using the acquired segmentation data, and
perform segmentation of the tooth region by inputting the generated artifact reduction data to the second learning model.

2. The segmentation device according to claim 1, wherein the data of the constituent maxillofacial region input to the input interface is data of a tooth region or data of a region including the tooth region and a surrounding region thereof.

3. The segmentation device according to claim 1, wherein the segmentation data output from the learning model is segmentation data of at least one of teeth, enamel, dentine, dental pulp, dental pulp cavities, cementum, cortical bone, cancellous bone, neural tubes, blood vessels, a jawbone, and a highly X-ray absorbent material.

4. The segmentation device according to claim 1, wherein the training data includes training data in which data of a region including at least a tooth region in the constituent maxillofacial region and the segmentation data of each of a plurality of biological feature regions in the tooth region are associated with each other.

5. The segmentation device according to claim 4, wherein the training data includes training data in which the data of the region including at least the tooth region and segmentation data of regions of enamel, dentine, and dental pulp in the tooth region are associated with each other.

6. The segmentation device according to claim 1, wherein the training data includes training data in which the data of the constituent maxillofacial region and the segmentation data of biological feature region supporting teeth are associated with each other.

7. The segmentation device according to claim 4, wherein the learning model is a model which is generated using the training data such that the segmentation data of each of the plurality of biological feature regions in the tooth region is output when the data of the region including at least the tooth region in the constituent maxillofacial region is input.

8. The segmentation device according to claim 6, wherein the learning model is a model which is generated using the training data such that the segmentation data of the biological feature region supporting teeth is output when the data of the constituent maxillofacial region is input.

9. The segmentation device according to claim 1, wherein the training data further includes at least one of:
    third training data in which data of a region including at least a tooth region in the constituent maxillofacial region and segmentation data of each of a plurality of biological feature regions in the tooth region are associated with each other; and
    fourth training data in which the data of the constituent maxillofacial region and segmentation data of biological feature region supporting teeth are associated with each other.

10. The segmentation device according to claim 9, wherein the learning model further includes at least one of:
    a third learning model which is generated using the third training data such that the segmentation data of each of the plurality of biological feature regions in the tooth region is output when the data of the region including at least the tooth region in the constituent maxillofacial region is input; and
    a fourth learning model which is generated using the fourth training data such that the segmentation data of the biological feature region supporting teeth is output when the data of the constituent maxillofacial region is input.

11. The segmentation device according to claim 10, wherein the learning model includes the second learning model and the third learning model, and
    wherein the processor is configured to:
        acquire the segmentation data of the tooth region by inputting the data of the constituent maxillofacial region to the second learning model;
        generate data of the tooth region using the acquired segmentation data; and
        acquire segmentation data of enamel, dentine, and dental pulp and to perform segmentation of the feature region by inputting the generated data of the tooth region to the third learning model.

12. The segmentation device according to claim 10, wherein the learning model includes the second learning model and the fourth learning model, and
    wherein the processor is configured to:
        acquire the segmentation data of the tooth region by inputting the data of the constituent maxillofacial region to the second learning model;
        perform a division process of dividing the tooth region and a region other than the tooth region in the constituent maxillofacial region using the acquired segmentation data; and
        acquire segmentation data of the biological feature region supporting teeth in the region other than the tooth region and to perform segmentation of the feature region by inputting the data of the constituent maxillofacial region having been subjected to the division process to the fourth learning model.

13. A segmentation device comprising:
    an input interface configured to receive an input of data of a constituent maxillofacial region which is at least a part of a maxillofacial region;
    a processor configured to perform segmentation of a feature region which is at least one of a biological feature region and an artificial feature region included in the constituent maxillofacial region using the data of the constituent maxillofacial region input to the input interface and a previously generated learning model; and
    an output interface configured to output a result of execution from the processor;
    wherein the learning model is a model which is generated using training data such that segmentation data of the feature region is output when at least one of projection data and reconfiguration data acquired by an X-ray CT scan or an MRI scan, or data derived from the at least one of projection data and reconfiguration data is input, and
    wherein the processor is configured to acquire segmentation data of enamel, cementum, dentine, and alveolar bone using the data of the constituent maxillofacial region input to the input interface and the learning model, and to calculate an absorbance of the alveolar bone on the basis of the acquired segmentation data.

14. The segmentation device according to claim 13, wherein the processor is configured to calculate the absorbance of the alveolar bone on the basis of a ratio of a second distance from a boundary between enamel and dentine in the acquired segmentation data of enamel, cementum, dentine, and the alveolar bone to an alveolar crest to a first distance from the boundary to a root apex of the alveolar bone.

* * * * *